United States Patent
Chen et al.

(10) Patent No.: US 12,335,113 B2
(45) Date of Patent: Jun. 17, 2025

(54) SERVICE LEVEL ADJUSTMENT METHOD AND APPARATUS, DEVICE, AND STORAGE MEDIUM

(71) Applicant: Huawei Technologies Co., Ltd., Shenzhen (CN)

(72) Inventors: Shuang Chen, Beijing (CN); Lei Li, Beijing (CN); Jun Gong, Beijing (CN); Xiaodong Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 273 days.

(21) Appl. No.: 17/870,435

(22) Filed: Jul. 21, 2022

(65) Prior Publication Data

US 2022/0377016 A1  Nov. 24, 2022

Related U.S. Application Data

(63) Continuation of application No. PCT/CN2021/073420, filed on Jan. 22, 2021.

(30) Foreign Application Priority Data

Jan. 22, 2020 (CN) .......................... 202010075494.5
Jul. 3, 2020 (CN) .......................... 202010636735.9

(51) Int. Cl.
*H04L 41/5025* (2022.01)
*H04L 41/5003* (2022.01)
(Continued)

(52) U.S. Cl.
CPC ...... *H04L 41/5025* (2013.01); *H04L 41/5003* (2013.01); *H04L 47/2425* (2013.01); *H04L 47/52* (2013.01)

(58) Field of Classification Search
CPC ............... H04L 41/082; H04L 41/5003; H04L 41/5025; H04L 43/0876; H04L 43/16;
(Continued)

(56) References Cited

U.S. PATENT DOCUMENTS

| | | | | |
|---|---|---|---|---|
| 6,081,513 A | * | 6/2000 | Roy | H04Q 11/0478 379/202.01 |
| 7,394,780 B1 | * | 7/2008 | Gregory | H04L 1/0009 370/316 |

(Continued)

FOREIGN PATENT DOCUMENTS

| | | |
|---|---|---|
| CN | 1918937 A | 2/2007 |
| CN | 103326961 B | 6/2016 |

(Continued)

OTHER PUBLICATIONS

S2-172320, (revision of S2-171867), Huawei et al, TS 23.501: Enforcement of Session AMBR, SA WG2 Meeting #120, Mar. 27-31, 2017, Busan, South Korea, 6 pages.

(Continued)

*Primary Examiner* — Dung B Huynh
(74) *Attorney, Agent, or Firm* — Conley Rose, P.C.

(57) ABSTRACT

A service level adjustment method includes obtaining by a first network device at least one piece of queue status information at a target service level of the first network device; when any one of the at least one piece of queue status information exceeds a first threshold upper limit corresponding to the any queue status information, adjusting by the first network device a parameter of the target service level based on a maximum delay associated with the target service level; when the queue status information at the target service level exceeds the corresponding threshold upper limit, adjusting by the first network device the parameter of the target service level based on the associated maximum delay.

20 Claims, 8 Drawing Sheets

(51) Int. Cl.
*H04L 47/2425* (2022.01)
*H04L 47/52* (2022.01)

(58) Field of Classification Search
CPC ..... H04L 47/2425; H04L 47/30; H04L 47/50;
H04L 47/52; H04L 47/56
See application file for complete search history.

(56) References Cited

U.S. PATENT DOCUMENTS

| | | | | |
|---|---|---|---|---|
| 7,436,765 B2* | 10/2008 | Sisto | ................ | H04L 47/70 370/236 |
| 7,719,977 B2* | 5/2010 | Sisto | ................ | H04L 47/22 370/395.51 |
| 8,036,372 B2* | 10/2011 | Patakula | ............ | H04M 3/5233 379/266.03 |
| 8,688,129 B2* | 4/2014 | Gogic | .................. | H04L 47/70 455/565 |
| 8,924,981 B1* | 12/2014 | Brown | .............. | G06F 16/24532 709/225 |
| 9,014,264 B1* | 4/2015 | Cheng | ................ | H04L 47/12 375/240.18 |
| 9,161,317 B2* | 10/2015 | Park | ..................... | H04W 24/10 |
| 9,454,321 B1* | 9/2016 | Smaldone | ............ | G06F 3/061 |
| 9,485,326 B1* | 11/2016 | Ulman | ............... | H04L 49/9084 |
| 9,641,411 B1* | 5/2017 | Rogan | ........... | G06Q 10/06375 |
| 10,382,380 B1* | 8/2019 | Suzani | ................. | H04L 47/629 |
| 10,764,191 B2 | 9/2020 | Guck et al. | | |
| 10,817,424 B1* | 10/2020 | Amrani | ............... | G06F 12/0813 |
| 11,864,173 B2* | 1/2024 | Yang | ................. | H04W 80/02 |
| 2001/0051992 A1* | 12/2001 | Yang | .................. | H04L 47/10 709/207 |
| 2002/0075882 A1* | 6/2002 | Donis | ................. | H04L 49/205 370/429 |
| 2003/0214928 A1* | 11/2003 | Chuah | .................. | H04L 47/70 370/336 |
| 2005/0169171 A1 | 8/2005 | Cheng et al. | | |
| 2006/0227796 A1* | 10/2006 | Wei | .................... | H04L 47/2433 370/412 |
| 2006/0291392 A1* | 12/2006 | Alicherry | ............. | H04L 45/02 370/235 |
| 2007/0008986 A1* | 1/2007 | Xie | ....................... | H04L 47/32 370/412 |
| 2007/0016726 A1* | 1/2007 | Zohar | ................ | G06F 11/3433 711/114 |
| 2007/0058536 A1* | 3/2007 | Vaananen | ................ | H04L 47/10 370/230 |
| 2007/0116051 A1* | 5/2007 | Chen | ...................... | H04W 8/26 370/328 |
| 2007/0263537 A1* | 11/2007 | Cahn | ................... | H04L 47/2441 370/231 |
| 2008/0020775 A1* | 1/2008 | Willars | ............... | H04L 47/2408 455/445 |
| 2008/0043623 A1* | 2/2008 | Franceschini | ......... | H04W 72/52 370/235 |
| 2008/0247357 A1 | 10/2008 | Kim et al. | | |
| 2008/0285465 A1* | 11/2008 | Yang | ....................... | H04L 41/06 370/241 |
| 2008/0285581 A1* | 11/2008 | Maiorana | ............... | H04L 69/16 370/415 |
| 2009/0240998 A1* | 9/2009 | Nikkila | ................ | H04W 72/52 714/E11.002 |
| 2010/0020685 A1* | 1/2010 | Short | .................... | H04L 47/32 370/230 |
| 2010/0118883 A1* | 5/2010 | Jones | ................. | H04L 47/6215 370/412 |
| 2010/0188974 A1* | 7/2010 | Rochon | .............. | H04L 69/04 370/477 |
| 2010/0274919 A1* | 10/2010 | Greene | ................ | H04L 47/70 709/231 |
| 2011/0110221 A1* | 5/2011 | Hlibiciuc | ............. | H04Q 3/0025 370/252 |
| 2011/0274053 A1 | 11/2011 | Baik et al. | | |
| 2011/0289330 A1* | 11/2011 | Gao | ...................... | G06F 1/3246 713/320 |
| 2012/0014282 A1* | 1/2012 | Pappu | ................ | H04L 47/2483 370/253 |
| 2012/0023254 A1* | 1/2012 | Park | ....................... | H04L 65/60 709/231 |
| 2012/0063526 A1* | 3/2012 | Xiao | ................... | H04L 47/245 375/259 |
| 2012/0114112 A1* | 5/2012 | Rauschenberger | . | H04M 3/5166 379/265.02 |
| 2012/0213070 A1 | 8/2012 | Lee et al. | | |
| 2012/0213075 A1* | 8/2012 | Koie | ................... | H04L 47/2441 370/235 |
| 2012/0233315 A1 | 9/2012 | Hoffman et al. | | |
| 2013/0100816 A1* | 4/2013 | Bergamasco | ........... | H04L 47/25 370/237 |
| 2013/0185475 A1* | 7/2013 | Talagala | ............... | G06F 12/0866 711/102 |
| 2013/0188482 A1* | 7/2013 | Lee | ........................ | H04L 47/25 370/235 |
| 2013/0223222 A1* | 8/2013 | Kotecha | ............... | H04L 43/0882 370/235 |
| 2013/0225228 A1* | 8/2013 | Park | ..................... | H04W 52/243 455/522 |
| 2013/0294403 A1* | 11/2013 | Srinivasan | ............ | H04W 88/12 370/328 |
| 2013/0329598 A1* | 12/2013 | DiFazio | .............. | H04W 72/542 370/254 |
| 2014/0095775 A1* | 4/2014 | Talagala | ............... | G06F 12/0891 711/103 |
| 2014/0195564 A1* | 7/2014 | Talagala | ............... | G06F 12/0804 707/802 |
| 2014/0286160 A1* | 9/2014 | Zhang | ................. | H04L 47/2433 370/230 |
| 2014/0355439 A1* | 12/2014 | Kakadia | ............... | H04L 41/5025 370/235 |
| 2015/0016266 A1* | 1/2015 | Dumitrescu | ........ | H04L 47/2441 370/236 |
| 2015/0049602 A1* | 2/2015 | Gavita | .................. | H04W 4/029 370/229 |
| 2015/0063112 A1 | 3/2015 | Wu et al. | | |
| 2015/0092585 A1* | 4/2015 | Shao | ..................... | H04L 47/283 370/252 |
| 2015/0156082 A1* | 6/2015 | Kakadia | ............... | H04L 47/30 709/223 |
| 2015/0189539 A1 | 7/2015 | Li et al. | | |
| 2015/0222560 A1 | 8/2015 | Kakadia et al. | | |
| 2015/0244804 A1* | 8/2015 | Warfield | ................. | H04L 49/90 709/219 |
| 2015/0295855 A1* | 10/2015 | Karthikeyan | ....... | H04L 65/1106 370/232 |
| 2015/0332145 A1* | 11/2015 | Vasseur | ................. | H04L 43/062 706/12 |
| 2016/0061667 A1* | 3/2016 | Hwang | .................. | G01K 7/01 374/183 |
| 2016/0119920 A1* | 4/2016 | Mallik | ................. | H04W 72/20 370/336 |
| 2016/0183284 A1* | 6/2016 | Chaudhuri | .......... | H04W 72/569 370/329 |
| 2016/0191395 A1* | 6/2016 | Bao | ......................... | H04W 4/18 370/235 |
| 2016/0241477 A1* | 8/2016 | Garcia | ................ | H04L 47/6295 |
| 2016/0381610 A1* | 12/2016 | Pu | ..................... | H04W 36/0058 455/436 |
| 2017/0070408 A1* | 3/2017 | Liao | .................... | H04L 67/02 |
| 2017/0078313 A1* | 3/2017 | Zhong | .................. | H04L 45/021 |
| 2017/0134250 A1* | 5/2017 | Buscemi | ................ | H04L 43/08 |
| 2017/0163495 A1* | 6/2017 | Kurian | ................ | H04L 67/1008 |
| 2017/0244991 A1* | 8/2017 | Aggarwal | ............ | G06V 20/46 |
| 2017/0245171 A1* | 8/2017 | Jung | .................. | H04L 43/0852 |
| 2017/0317944 A1* | 11/2017 | John | ................... | H04L 43/0864 |
| 2017/0359749 A1* | 12/2017 | Dao | ..................... | H04L 47/2416 |
| 2018/0048575 A1* | 2/2018 | Mangin | ................ | H04L 47/20 |
| 2018/0048691 A1* | 2/2018 | Pruden | ............... | H04L 47/2433 |
| 2018/0083866 A1* | 3/2018 | Gobriel | ................ | H04L 45/02 |
| 2018/0091388 A1* | 3/2018 | Levy | ................... | H04L 43/12 |
| 2018/0159766 A1* | 6/2018 | Cui | ........................ | H04W 28/24 |

(56) References Cited

U.S. PATENT DOCUMENTS

| | | | |
|---|---|---|---|
| 2018/0227902 A1* | 8/2018 | Gholmieh | H04B 7/0413 |
| 2018/0249375 A1* | 8/2018 | Goldhamer | H04L 1/0026 |
| 2018/0324617 A1* | 11/2018 | Schmidt | H04W 24/08 |
| 2019/0007337 A1 | 1/2019 | Guck et al. | |
| 2019/0089760 A1* | 3/2019 | Zhang | H04L 65/70 |
| 2019/0207856 A1 | 7/2019 | Guck et al. | |
| 2019/0261195 A1* | 8/2019 | Cheng | H04W 76/27 |
| 2019/0332702 A1* | 10/2019 | Manamohan | G06F 11/3006 |
| 2020/0014581 A1* | 1/2020 | Aaron | H04L 41/40 |
| 2020/0067793 A1* | 2/2020 | Dribinski | H04W 36/0022 |
| 2020/0145080 A1* | 5/2020 | Tang | H04B 7/088 |
| 2020/0204460 A1* | 6/2020 | Schneider | H04L 43/20 |
| 2020/0257928 A1* | 8/2020 | Iiduka | G06F 18/217 |
| 2020/0274794 A1* | 8/2020 | Zhang | H04L 41/5006 |
| 2020/0313837 A1* | 10/2020 | Vejlgaard | H04W 72/541 |
| 2020/0314677 A1* | 10/2020 | Kim | H04W 24/10 |
| 2020/0334615 A1* | 10/2020 | Benjamin | G06Q 30/016 |
| 2020/0367110 A1* | 11/2020 | Sun | H04W 28/24 |
| 2021/0006614 A1* | 1/2021 | Oyman | H04L 65/756 |
| 2021/0044539 A1* | 2/2021 | Kottapalli | H04L 47/822 |
| 2021/0058453 A1* | 2/2021 | Balasubramanian | H04L 67/101 |
| 2021/0075738 A1* | 3/2021 | Clemm | H04L 69/22 |
| 2021/0092753 A1* | 3/2021 | Choi | H04W 72/542 |
| 2021/0126874 A1* | 4/2021 | Glasco | H04L 41/0894 |
| 2021/0282038 A1* | 9/2021 | Li | H04L 41/14 |
| 2021/0329666 A1* | 10/2021 | Ljung | H04W 72/542 |
| 2021/0359931 A1* | 11/2021 | Wang | H04L 47/50 |
| 2022/0030308 A1* | 1/2022 | Bentaleb | H04N 21/23439 |
| 2022/0377016 A1 | 11/2022 | Chen et al. | |
| 2022/0414500 A1* | 12/2022 | Yadav | H04L 45/70 |
| 2024/0272830 A1* | 8/2024 | Jung | G06F 3/0658 |

FOREIGN PATENT DOCUMENTS

| | | |
|---|---|---|
| CN | 104584627 B | 5/2018 |
| CN | 109245936 A | 1/2019 |
| CN | 109547362 A | 3/2019 |
| CN | 109787801 A | 5/2019 |
| CN | 110267310 A | 9/2019 |
| EP | 1187404 A2 | 3/2002 |
| IN | 102739507 A | 10/2012 |
| JP | 2002135329 A | 5/2002 |
| JP | 2002344509 A | 11/2002 |
| JP | 2003110605 A | 4/2003 |
| WO | 2018205900 A1 | 11/2018 |

OTHER PUBLICATIONS

Request for Comments: 1633, R. Braden et al, Integrated Services in the Internet Architecture: an Overview, Network Working Group, Jun. 1994, 33 pages.

Request for Comments: 2475, S. Blake et al, An Architecture for Differentiated Services, Network Working Group, Dec. 1998, 36 pages.

* cited by examiner

SERVICE LEVEL ADJUSTMENT METHOD AND APPARATUS, DEVICE, AND STORAGE MEDIUM

CROSS-REFERENCE TO RELATED APPLICATIONS

This application is a continuation application of International Patent Application No. PCT/CN2021/073420, filed on Jan. 22, 2021, which claims priority to Chinese Patent Application No. 202010075494.5, filed on Jan. 22, 2020, and claims priority to Chinese Patent Application No. 202010636735.9, filed on Jul. 3, 2020. The disclosures of the aforementioned applications are hereby incorporated by reference in their entireties.

TECHNICAL FIELD

This application relates to the communications field, and in particular, to a service level adjustment method and apparatus, a device, and a storage medium.

BACKGROUND

An emerging 5th generation (5G) ultra-reliable low-latency communication (URLLC) service poses a higher requirement on an Internet Protocol (IP) network. In addition to conventional reachability and bandwidth guarantee, a quantifiable end-to-end delay and packet loss rate guarantee further need to be provided. In an example, for this type of service, it needs to ensure that an end-to-end delay of a packet strictly meets a requirement that a specific maximum delay is not exceeded and a packet loss does not occur, or an end-to-end delay meets a requirement that a specific maximum delay is not exceeded with a specific probability. However, a conventional best-effort-based IP network cannot provide a deterministic service forwarding capability, and cannot meet a guaranteed end-to-end delay requirement.

SUMMARY

This application provides a service level adjustment method and apparatus, a device, and a storage medium, to improve network resource utilization while ensuring an end-to-end delay requirement of a service.

According to a first aspect, a service level adjustment method is provided. For example, a first network device performs the method. The method includes a first network device that obtains at least one piece of queue status information at a target service level. When any one of the at least one piece of queue status information exceeds a first threshold upper limit corresponding to the any queue status information, the first network device adjusts a parameter of the target service level based on a maximum delay associated with the target service level. When the queue status information at the target service level exceeds the corresponding threshold upper limit, the first network device adjusts the parameter of the target service level based on the associated maximum delay, so that network resource utilization is further improved while an end-to-end delay of a service is ensured.

In a possible implementation, adjusting a parameter of the target service level based on a maximum delay associated with the target service level includes determining an update value of the parameter of the target service level; and if the update value of the parameter of the target service level meets a constraint condition of a local target resource when the maximum delay remains unchanged, adjusting the parameter of the target service level based on the update value of the parameter of the target service level, where the target resource is a resource that can be preempted by the target service level.

In a possible implementation, after adjusting the parameter of the target service level based on the update value of the parameter of the target service level, the method further includes, when any queue status information does not exceed a second threshold upper limit within a first time threshold, adjusting the parameter of the target service level from the update value back to a value existing before adjustment to the update value.

In a possible implementation, after adjusting the parameter of the target service level based on the update value of the parameter of the target service level, the method further includes, when any queue status information exceeds a third threshold upper limit within a first time threshold, reporting update information of the target service level to a control device, where the update information includes the update value of the parameter of the target service level.

In a possible implementation, adjusting a parameter of the target service level based on a maximum delay associated with the target service level includes determining an update value of the parameter of the target service level; if the update value of the parameter of the target service level does not meet a constraint condition of a local target resource when the maximum delay remains unchanged, reporting exception information to a control device, where the exception information includes at least one of queue status information that exceeds the corresponding first threshold upper limit and an error signal indicating that a data flow exceeds an admission constraint, and the target resource is a resource that can be preempted by the target service level; receiving a first adjustment value that is of the parameter of the target service level and that is sent by the control device, where the first adjustment value is obtained based on the exception information; and adjusting the parameter of the target service level based on the first adjustment value of the parameter of the target service level.

In a possible implementation, the parameter of the target service level includes a queue resource parameter and a data flow constraint parameter; and determining an update value of the parameter of the target service level includes determining an update value of the data flow constraint parameter of the target service level based on an actually arriving data flow; and determining an update value of the queue resource parameter of the target service level based on the update value of the data flow constraint parameter of the target service level when the maximum delay remains unchanged.

In a possible implementation, the queue resource parameter of the target service level includes a queue bandwidth and a queue buffer, and the data flow constraint parameter of the target service level includes a threshold of a burst amount of a data flow and a threshold of an average rate of the data flow; and the determining an update value of the queue resource parameter of the target service level based on the update value of the data flow constraint parameter of the target service level when the maximum delay remains unchanged includes, when the maximum delay remains unchanged, determining a bandwidth of a port corresponding to the target service level, a maximum amount of data that can be forwarded at the target service level after the target service level is adjusted, a maximum amount of data that can be forwarded at each of a plurality of service levels of the first network device before the target service level is adjusted, and a maximum packet length of a queue corresponding to each of the plurality of service levels; determining the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted; and determining the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow.

In a possible implementation, the determining the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted includes determining, based on the bandwidth of the port corresponding to the target service level, the maximum amount of data that can be forwarded at the target service level after the target service level is adjusted, and the maximum amount of data that can be forwarded at each of the plurality of service levels before the target service level is adjusted, the queue bandwidth $C_i^2$ of the target service level according to the following formula:

$$C_i^2 = C \frac{Q_i^2}{\sum_{1 \leq j \leq n, j \neq i} Q_j + Q_i^1 + Q_{n+1}^1}$$

Herein, C is the bandwidth of the port corresponding to the target service level, $Q_i^2$ is the maximum amount of data that can be forwarded after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, and n is a positive integer greater than 1.

In a possible implementation, determining the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow includes determining, based on the maximum amount of data that can be forwarded at each of the plurality of service levels before the target service level is adjusted, the maximum packet length of the queue corresponding to each of the plurality of service levels, the update value of the threshold of the burst amount of the data flow at the target service level, and the update value of the threshold of the average rate of the data flow, the queue buffer $BF_i^2$ of the target service level according to the following formula:

$$BF_i^2 = \left( \frac{L_{max,L} + \sum_{1 \leq j \leq n, j \neq i}(L_j + Q_j) + L_{n+1} + Q_{n+1}^2}{C} + \frac{L_i\left(\sum_{1 \leq j \leq n, j \neq i} Q_j + Q_{n+1}^2\right)}{CQ_i^2} \right) * r_i^2 + b_i^2$$

Herein, C is the bandwidth of the port corresponding to the target service level, $Q_i^2$ is the maximum amount of data that can be forwarded after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_i^2$ is the update value of the threshold of the burst amount of the data flow, $r_i^2$ is the update value of the threshold of the average rate of the data flow, $L_i$ is a maximum packet length of a queue at the target service level, and n is a positive integer greater than 1.

In a possible implementation, the method further includes receiving a second adjustment value that is of the parameter of the target service level and that is sent by the control device; and adjusting the parameter of the target service level based on the second adjustment value of the parameter of the target service level.

In a possible implementation, the queue status information includes at least one piece of queue status information such as queue buffer occupation, a packet queuing delay, and a queue packet count.

According to a second aspect, a service level adjustment apparatus is provided. The apparatus includes an obtaining unit, configured to obtain at least one piece of queue status information at a target service level; and an adjustment unit, configured to, when any one of the at least one piece of queue status information exceeds a first threshold upper limit corresponding to the any queue status information, adjust a parameter of the target service level based on a maximum delay associated with the target service level.

In a possible implementation, the adjustment unit is configured to determine an update value of the parameter of the target service level; and if the update value of the parameter of the target service level meets a constraint condition of a local target resource when the maximum delay remains unchanged, adjust the parameter of the target service level based on the update value of the parameter of the target service level, where the target resource is a resource that can be preempted by the target service level.

In a possible implementation, the adjustment unit is further configured to, when any queue status information does not exceed a second threshold upper limit within a first time threshold, adjust the parameter of the target service level from the update value back to a value existing before adjustment to the update value.

In a possible implementation, the apparatus further includes a reporting unit, configured to, when any queue status information exceeds a third threshold upper limit within a first time threshold, report update information of the target service level to a control device, where the update information includes the update value of the parameter of the target service level.

In a possible implementation, the adjustment unit is configured to determine an update value of the parameter of the target service level; if the update value of the parameter of the target service level does not meet a constraint condition of a local target resource when the maximum delay remains unchanged, report exception information to a control device, where exception information includes at least one of queue status information that exceeds the corresponding first threshold upper limit and an error signal indicating that a data flow exceeds an admission constraint, and the target resource is a resource that can be preempted by the target service level; receive a first adjustment value that is of the parameter of the target service level and that is sent by the control device, where the first adjustment value is obtained based on the exception information; and adjust the parameter of the target service level based on the first adjustment value of the parameter of the target service level.

In a possible implementation, the parameter of the target service level includes a queue resource parameter and a data flow constraint parameter. The adjustment unit is configured to determine an update value of the data flow constraint parameter of the target service level based on an actually arriving data flow; and determine an update value of the queue resource parameter of the target service level based on the update value of the data flow constraint parameter of the target service level when the maximum delay remains unchanged.

In a possible implementation, the queue resource parameter of the target service level includes a queue bandwidth and a queue buffer, and the data flow constraint parameter of the target service level includes a threshold of a burst amount of a data flow and a threshold of an average rate of the data flow.

The adjustment unit is configured to, when the maximum delay remains unchanged, determine a bandwidth of a port corresponding to the target service level, a maximum amount of data that can be forwarded at the target service level after the target service level is adjusted, a maximum amount of data that can be forwarded at each of a plurality of service levels of the first network device before the target service level is adjusted, and a maximum packet length of a queue corresponding to each of the plurality of service levels; determine the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted; and determine the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow.

In a possible implementation, the adjustment unit is configured to determine, based on the bandwidth of the port corresponding to the target service level, the maximum amount of data that can be forwarded at the target service level after the target service level is adjusted, and the maximum amount of data that can be forwarded at each of the plurality of service levels before the target service level is adjusted, the queue bandwidth $C_i^2$ of the target service level according to the following formula:

$$C_i^2 = C \frac{Q_i^2}{\sum_{1 \leq j \leq n, j \neq i} Q_j + Q_i^1 + Q_{n+1}^1}$$

Herein, C is the bandwidth of the port corresponding to the target service level, $Q_i^2$ is the maximum amount of data that can be forwarded at the target service level after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, and n is a positive integer greater than 1.

In a possible implementation, the adjustment unit is configured to determine, based on the maximum amount of data that can be forwarded at each of the plurality of service levels before the target service level is adjusted, the maximum packet length of the queue corresponding to each of the plurality of service levels, the update value of the threshold of the burst amount of the data flow at the target service level, and the update value of the threshold of the average rate of the data flow, the queue buffer $BF_i^2$ of the target service level according to the following formula:

$$BF_i^2 = \left( \frac{L_{max,L} + \sum_{1 \leq j \leq n, j \neq i}(L_j + Q_j) + L_{n+1} + Q_{n+1}^2}{C} + \frac{L_i\left(\sum_{1 \leq j \leq n, j \neq i} Q_j + Q_{n+1}^2\right)}{CQ_i^2} \right) * r_i^2 + b_i^2$$

Herein, C is the bandwidth of the port corresponding to the target service level, $Q_i^2$ is the maximum amount of data that can be forwarded at the target service level after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_i^2$ is the update value of the threshold of the burst amount of the data flow, $r_i^2$ is the update value of the threshold of the average rate of the data flow, $L_i$ is a maximum packet length of a queue at the target service level, and n is a positive integer greater than 1.

In a possible implementation, the apparatus further includes a receiving unit, configured to receive a second adjustment value that is of the parameter of the target service level and that is sent by the control device; and the adjustment unit is further configured to adjust the parameter of the target service level based on the second adjustment value of the parameter of the target service level.

According to a third aspect, a network device is provided, and performs the method in the implementations of the first aspect. For example, the network device includes units configured to perform the method in the implementations of the first aspect.

According to a fourth aspect, a computer-readable medium is provided, and includes a computer program or instructions. When the computer program or the instructions are executed on a computer, the computer is enabled to perform the method in the implementation of the first aspect.

A communications apparatus is provided. The apparatus includes a transceiver, a memory, and a processor. The transceiver, the memory, and the processor communicate with each other through an internal connection channel, the memory is configured to store a computer program or instructions, and the processor is configured to execute the computer program or the instructions stored in the memory, to control the transceiver to receive a signal and control the transceiver to send a signal. In addition, when the processor executes the computer program or the instructions stored in the memory, the processor is enabled to perform the method according to any one of the first aspect or the possible implementations of the first aspect.

In an example embodiment, there are one or more processors, and there are one or more memories.

In an example embodiment, the memory may be integrated with the processor, or the memory is disposed independently of the processor.

In an implementation process, the memory may be a non-transitory memory, for example, a read-only memory (ROM). The memory and the processor may be integrated into one chip, or may be disposed in different chips. A type of the memory and a manner in which the memory and the processor are disposed are not limited in this embodiment of this application.

According to a fifth aspect, a computer program (product) is provided. The computer program (product) includes computer program code, and when the computer program code is run by a computer, the computer is enabled to perform the method according to any one of the first aspect or the possible implementations of the first aspect.

According to a sixth aspect, a chip is provided, and includes a processor. The processor is configured to invoke a computer program or instructions stored in a memory from the memory and run the computer program or the instructions, so that a communications device on which the chip is installed performs the method according to any one of the first aspect or the possible implementations of the first aspect.

According to a seventh aspect, another chip is provided, and includes an input interface, an output interface, a processor, and a memory. The input interface, the output interface, the processor, and the memory are connected to each other through an internal connection channel. The processor is configured to execute code in the memory. When the code is executed, the processor is configured to perform the method according to any one of the first aspect or the possible implementations of the first aspect.

DESCRIPTION OF EMBODIMENTS

Figure 1:
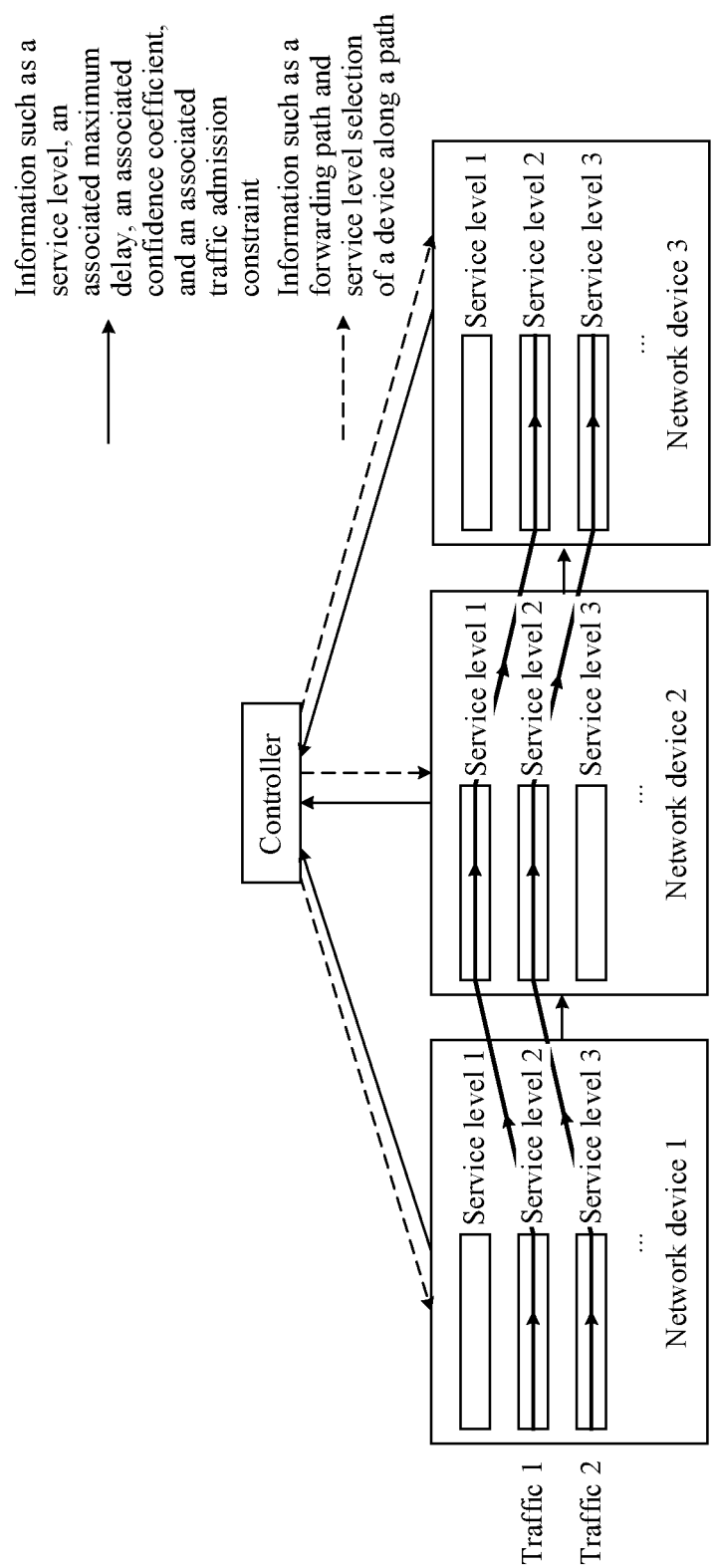
FIG. 1 is a schematic diagram of a service level adjustment scenario according to an embodiment of this application.

A service-level-based network configuration solution is designed according to a network calculus theory, to meet an end-to-end delay requirement of a service data flow. A schematic diagram shown in FIG. 1 is used as an example. Each egress port of each of network devices such as a network device 1, a network device 2, and a network device 3 in FIG. 1 maintains one or more service levels, and allocates corresponding resources such as a bandwidth and a buffer to a queue bound to the service level. The network device reports, to a controller, information such as a service level of the network device, an associated maximum delay, an associated confidence coefficient, and an associated data flow admission constraint. A new service needs to provide a subscribed committed data flow parameter of the new service, including a threshold of a burst amount of a data flow, a threshold of an average rate of the data flow, and the like. The controller performs service deployment based on service level information of each network device, including selecting a forwarding path and selecting a service level to be entered by each hop of network device on the path, to ensure that an end-to-end delay requirement of a service data flow is met, and ensure that the selected service level meets a data flow admission constraint of the selected service level. The controller further delivers information such as the forwarding path and selection of each hop of service level to the network device, so that the service data flow is forwarded based on the specified path and the service level.

However, in a current service-level-based quality of service (QoS) technology for ensuring an end-to-end delay, a service level reporting function and a service configuration delivery function are designed only based on static QoS settings, and a service-level-based technology for dynamically adjusting QoS is not considered when a service requirement, a real-time data flow, a network status, and the like change. Keeping the static QoS settings unchanged cannot ensure that the QoS settings are still optimal when related conditions change. On the contrary, when an end-to-end delay of a service data flow is ensured, if QoS is dynamically adjusted based on a service level, network resource utilization can be further improved while a service requirement is met, to enhance applicability and effectiveness of the overall solution.

In an example, embodiments of this application provide a service level adjustment method, so that based on changes of a service deployment status, an actual arrival status of a data flow, queue status information, and the like, parameter configurations of a service level such as a queue resource and a data flow constraint can be dynamically updated, and a service level through which the data flow passes can be dynamically switched, to further improve network resource utilization while ensuring an end-to-end delay of a service.

Figure 2:
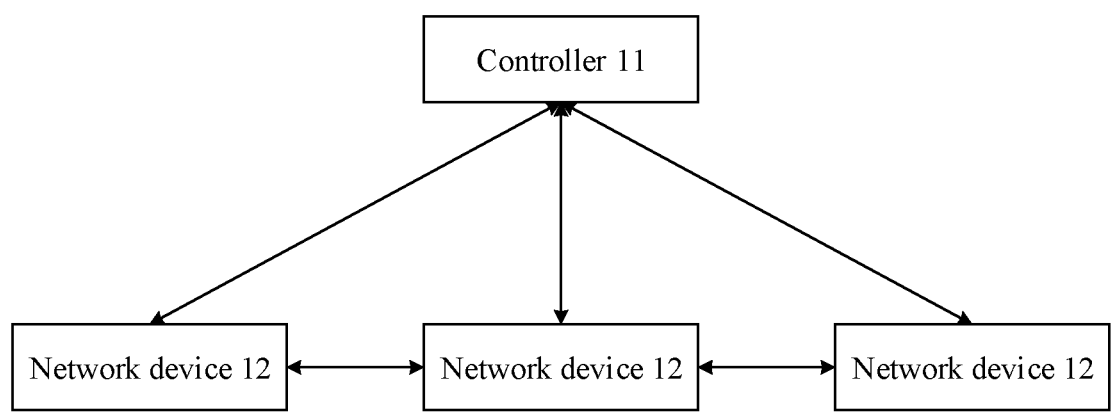
FIG. 2 is a schematic diagram of a service level adjustment scenario according to an embodiment of this application.

For example, the service level adjustment method provided in embodiments of this application is applied to a network scenario shown in FIG. 2. The network scenario includes a controller 11 and several network devices 12. For example, the network device 12 is one or more routers or switches that have a packet forwarding function. The controller 11 may be replaced with a server, a network device, or another software or hardware entity that has a same function such as path computation or resource allocation. In this embodiment of this application, only the controller is used as an example for description.

In the network scenario shown in FIG. 2, one or more service levels are set on each egress port of the network device 12, and each service level provides a corresponding service forwarding capability. In other words, a deterministic service forwarding capability provided by the network device 12 is defined as a service level of the network device 12. Each service level is bound to one queue or one group of queues in the network device 12. Each service level is associated with a maximum delay. The maximum delay represents a delay threshold allowed in a process of transmitting, by the network device 12, a data flow that is input into a queue bound to the service level. The delay threshold includes one or more of delays such as a queuing delay, a processing delay, and a sending delay. The queuing delay is a time period required by a packet to enter a queue for queuing. For example, the queuing delay is a time period required by a packet to enter a queue of a downlink traffic manager for queuing. The sending delay is a time period required by a network device to send a packet, that is, a time period required from sending the first bit of the packet to completing sending of the last bit of the packet. The processing delay is a time period required by the network device to perform operations such as packet header parsing, error check, and route search after the network device receives a packet.

Optionally, each service level may be further associated with a confidence coefficient, and the confidence coefficient indicates a probability that a delay generated when a data flow passes through the service level does not exceed the maximum delay. By default, the confidence coefficient may be set to 100%, indicating that the generated delay strictly does not exceed a value of the maximum delay.

To ensure a maximum delay requirement committed by a service level, resources, including but not limited to a queue bandwidth, a queue buffer, and the like, need to be allocated to a queue bound to the service level. For example, in a round robin scheduling mechanism, the queue bandwidth is a value obtained by multiplying a ratio of a queue weight to a total weight by a bandwidth of an egress port. In addition, a constraint condition also needs to be set for a data flow that is input into a queue, and includes but is not limited to a threshold of a burst amount of the data flow entering the queue, a threshold of an average rate of the data flow, and the like. The threshold of the burst amount of the data flow is represented as a maximum amount of data that is of the data flow and that is allowed in a specific short period of time, and the threshold of the average rate of the data flow is represented as a maximum value that is of the average rate of the data flow and that is allowed in a specific long period of time. When the queue resource and the data flow constraint condition are specified, it can be ensured that a specific maximum delay requirement can be met when the data flow passes through the service level.

When an external condition changes, it may be considered to adjust and update parameter configurations of a service level such as a queue resource and a data flow constraint to improve resource utilization.

For example, for a target service level of a first network device 12 in the several network devices 12, if it is determined that a large quantity of data flows enter the target service level, for example, approach or reach a data flow admission constraint upper limit, resources such as a bandwidth and a buffer that are pre-allocated to the target service level are insufficient. In this case, it may be considered to increase allocation of queue resources, for example, a bandwidth and a buffer, to the target service level while a maximum delay associated with the target service level remains unchanged. In addition, the data flow constraint is correspondingly loosened, for example, the threshold of the burst amount of the data flow or the threshold of the average rate of the data flow is increased. In this way, a bottleneck of the target service level can be eliminated, and more data flows can be accommodated, to improve resource utilization.

For another example, for a target service level of a first network device 12 in the several network devices 12, if a small quantity of data flows passes through the target service level in a period of time, for example, far from reaching a data flow admission constraint upper limit, resources such as a bandwidth and a buffer that are pre-allocated to the target service level are idle. In this case, it may be considered to reduce allocation of resources, for example, a bandwidth and a buffer, to the target service level while a maximum delay associated with the target service level remains unchanged. In addition, the data flow admission constraint is correspondingly tightened. When a total quantity of local resources of the first network device 12 is specified, a resource released from the target service level may be transferred to another service level of the first network device 12, to increase resource allocation to another service level. This helps these service levels accommodate more data flow requirements, to finally improve overall resource utilization.

In addition, when the external condition changes, it may be further considered to adjust service level selection of a deployed data flow along a path, that is, perform intra-device or even inter-device switching on a service level that is entered by the data flow along the path, to improve resource utilization.

For example, for a deployed data flow, if a target service level through which the data flow passes along a path approaches or reaches a data flow admission constraint upper limit, further deployment of more data flows is affected. It may be considered to switch the data flow from the target service level to an idle service level of this device or another device such as a second network device while ensuring that an end-to-end delay requirement of a service can still be met, to release a resource at an original location for deployment of another data flow, so as to improve overall resource utilization.

Figure 3:
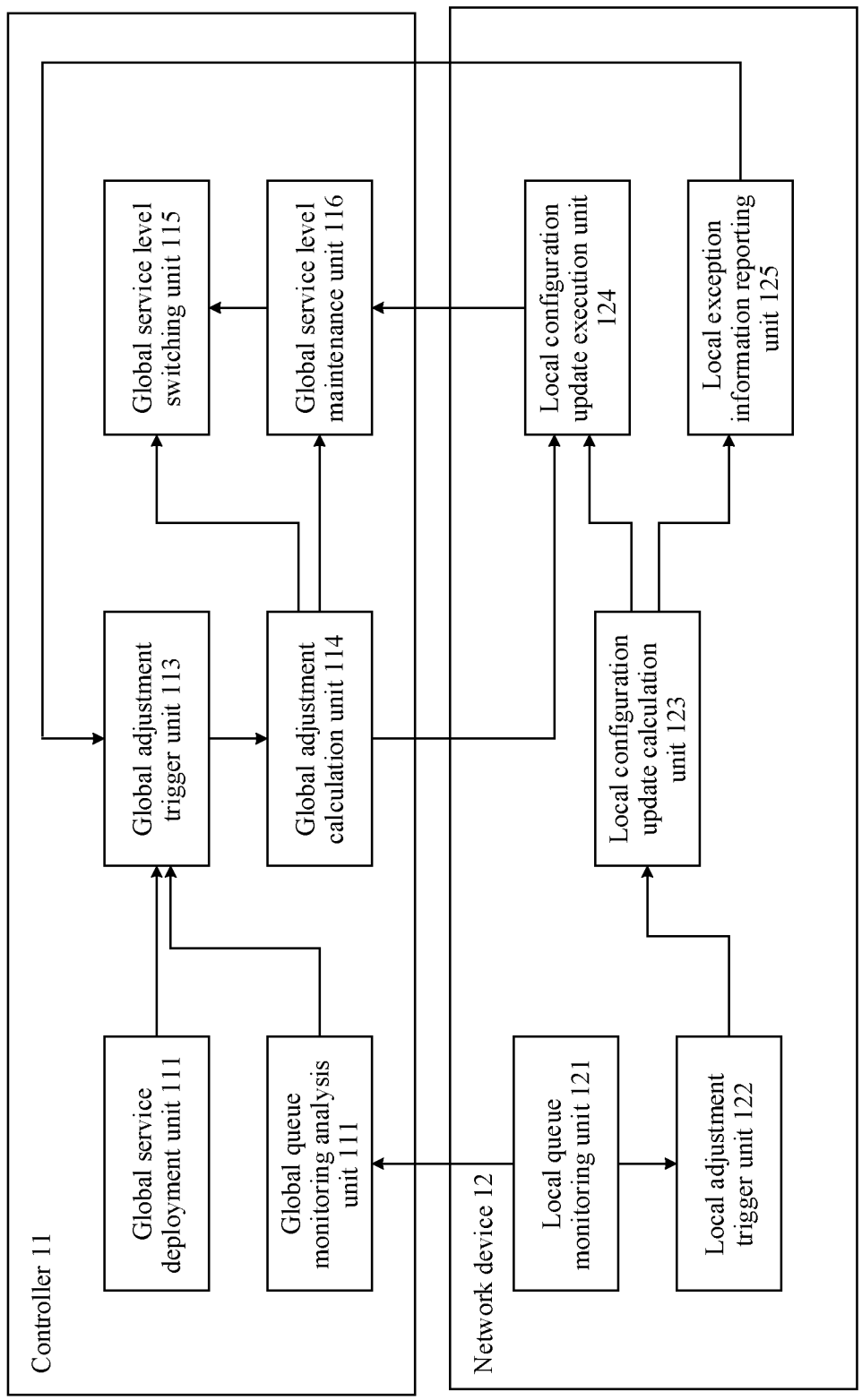
FIG. 3 is a schematic diagram of an architecture of a service level adjustment system according to an embodiment of this application.

A system architecture in an embodiment of this application is shown in FIG. 3. The system architecture includes unit modules of a controller 11 and a network device 12. In this embodiment of this application, one network device in FIG. 3 is used as an example for description. For example, the controller 11 includes but is not limited to a global service deployment unit 111, a global queue monitoring analysis unit 112, a global adjustment trigger unit 113, a global adjustment calculation unit 114, a global service level switching unit 115, and a global service level maintenance unit 116. The network device 12 includes but is not limited to a local queue monitoring unit 121, a local adjustment trigger unit 122, a local configuration update calculation unit 123, a local configuration update execution unit 124, and a local exception information reporting unit 125. For functions of the unit modules of the controller 11 and the network device 12, refer to related descriptions of method procedures shown in FIG. 5 and FIG. 6. Details are not described herein.

The method provided in embodiments of this application includes but is not limited to that when the network device locally triggers a QoS adjustment procedure, the network device determines, based on local queue status information, whether to trigger local QoS adjustment; if the network device determines to trigger QoS adjustment, the local device recalculates an update configuration related to a service level; and if a calculation result is feasible, performs related configuration update on a queue bound to the related service level, and reports configuration update information of the service level to the controller for synchronization, or if a calculation result is infeasible, reports exception information to the controller, and then triggers a global trigger process. For example, in a globally triggered QoS adjustment procedure, the controller determines, based on information such as global service admission, global queue monitoring analysis, and local exception information reporting, whether to trigger global QoS adjustment. If the controller determines to trigger QoS adjustment, the controller performs configuration update of a service level, or switches a service level of a deployed data flow.

The service level adjustment procedure locally triggered by the network device 12 can ensure that delay degradation or a packet loss of the data flow in a network is not caused during the configuration update of the service level or the switching of the service level of the data flow. For example, the method provided in this embodiment of this application is applicable to an IP network/bearer network based on packet statistical multiplexing, and helps improve applicability and effectiveness of a service-level-based solution for ensuring an end-to-end delay.

Figure 4:
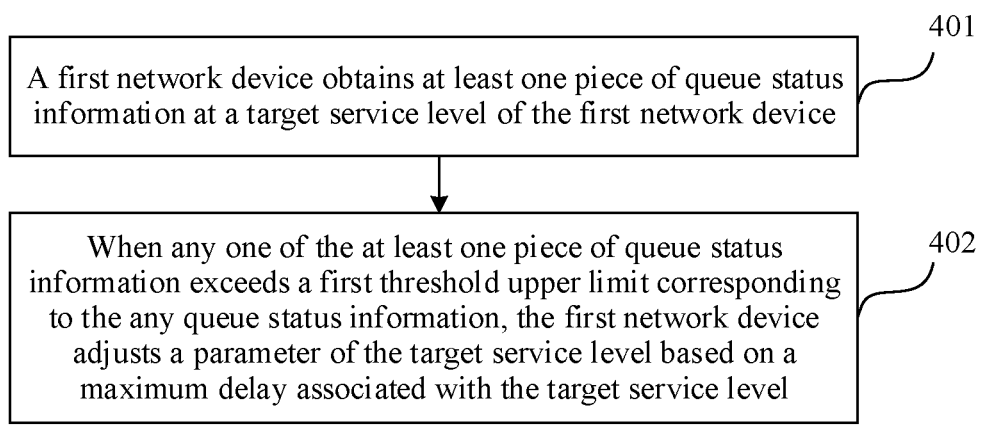
FIG. 4 is a flowchart of a service level adjustment method according to an embodiment of this application.

The following describes, by using an example in which the first network device triggers a service level adjustment process, a service level adjustment method provided in an embodiment of this application. As shown in FIG. 4, the service level adjustment method includes the following processes.

401: The first network device obtains at least one piece of queue status information at a target service level of the first network device.

In an example embodiment, the first network device presets one or more service levels for a port of the first network device, and the first network device monitors local queue status information at a plurality of service levels of the first network device in real time, to obtain at least one piece of queue status information at the target service level. A quantity of service levels that are set on an egress port of the first network device is not limited in this embodiment of this application. If one service level is set on the egress port of the first network device, the target service level is the one service level that is set on the egress port of the first network device. If a plurality of service levels is set on the egress port of the first network device, the target service level is any one of the plurality of service levels that are set on the egress port of the first network device.

For example, each service level is bound to one or more queues in the first network device, and a plurality of queues are referred to as a group of queues. If the target service level is bound to a group of queues in the first network device, the queue status information at the target service level is queue status information of each queue in the group of queues bound to the target service level, or the queue status information at the target service level is overall queue status information of the group of queues bound to the target service level. The queue status information at the target service level includes but is not limited to at least one piece of queue status information such as local queue buffer occupation, a packet queuing delay, and a queue packet count. The queue buffer occupation represents a size of a buffer occupied by a packet in a queue bound to the target service level. The packet queuing delay represents a queuing delay of the packet in the queue bound to the target service level, and includes a time interval from a time point at which the packet enters a buffer to a time point at which the packet is scheduled. The queue packet count represents a data amount per unit time or a packet quantity per unit time of the packet in the queue bound to the target service level.

It should be noted that when the queue status information at the target service level is the overall queue status information of the group of queues bound to the target service level, for the queue buffer occupation, the overall queue status information refers to a sum of queue buffer occupation of the group of bound queues, that is, queue buffer occupation of queues in the group of bound queues is accumulated, and an obtained result is used as the overall queue status information; for the packet queuing delay, the overall queue status information refers to a largest value in packet queuing delays of queues in the group of bound queues, or an average value of packet queuing delays of queues in the group of bound queues; and for the queue packet count, the overall queue status information refers to a sum of queue packet counts of the group of bound queues, that is, queue packet counts of queues in the group of bound queues are accumulated, and an obtained result is used as the overall queue status information.

402: When any one of the at least one piece of queue status information exceeds a first threshold upper limit corresponding to the any queue status information, the first network device adjusts a parameter of the target service level based on a maximum delay associated with the target service level.

For example, the queue status information includes the local queue buffer occupation, the packet queuing delay, and the queue packet count. If it is detected that buffer occupation of a queue bound to the target service level exceeds a first threshold upper limit of the buffer occupation, a packet queuing delay exceeds a first threshold upper limit of the packet queuing delay, or a packet quantity per unit time, that is, a queue packet count, exceeds a first threshold upper limit of the queue packet count, the first network device is triggered to adjust the target service level based on the maximum delay associated with the target service level.

It should be noted that, if the target service level is bound to a group of queues in the first network device, when the queue status information at the target service level is queue status information of each queue in the group of queues bound to the target service level, a first threshold upper limit corresponding to each piece of queue status information at the target service level may be set based on a single queue, and first threshold upper limits corresponding to same queue status information of queues in the group of queues may be the same or different. When the queue status information at the target service level is overall queue status information of the group of queues bound to the target service level, a first threshold upper limit corresponding to each piece of queue status information at the target service level may be set based on a quantity of queues in the group of queues. In addition, another manner may be used. A first threshold upper limit corresponding to each type of queue status information is not limited in this embodiment of this application. For example, the first threshold upper limit of the buffer occupation, the first threshold upper limit of the packet queuing delay, and the first threshold upper limit of the queue packet count may be set based on experience, or may be configured and updated based on an application scenario.

Regardless of which type of queue status information exceeds the corresponding first threshold upper limit, when any one of the at least one piece of queue status information exceeds the first threshold upper limit corresponding to the any queue status information, the first network device may be triggered to locally adjust the parameter of the target service level. In this embodiment of this application, the maximum delay represents a delay threshold allowed in a process of transmitting, by the network device, a data flow that is input into the queue bound to the service level, and the maximum delay includes a delay allowed in a process of forwarding, by the network device, the data flow that is input into the queue bound to the service level. The delay threshold includes one or more of delays such as a queuing delay, a processing delay, and a sending delay of the first network device. Therefore, the maximum delay associated with the target service level is obtained based on the detected queuing delay or the delay of transmitting the data flow by the network device. Alternatively, the maximum delay may be configured by a control device such as the controller. Therefore, the network device obtains the maximum delay from the controller. For example, based on a local resource status, that the first network device adjusts the parameter of the target service level based on the maximum delay associated with the target service level includes but is not limited to the following two cases.

Case 1: The update value of the parameter of the target service level meets a constraint condition of a local target resource when the maximum delay remains unchanged. In Case 1, that the first network device adjusts the parameter of the target service level based on the maximum delay associated with the target service level includes but is not limited to two processes: 4021A and 4022A.

4021A: Determine the update value of the parameter of the target service level.

For example, the parameter of the target service level includes a queue resource parameter and a data flow constraint parameter. The determining the update value of the parameter of the target service level includes but is not limited to determining an update value of the data flow constraint parameter of the target service level based on an actually arriving data flow; and determining an update value of the queue resource parameter of the target service level based on the update value of the data flow constraint parameter of the target service level when the maximum delay remains unchanged.

In an example embodiment, the queue resource parameter of the target service level includes a queue bandwidth and a queue buffer, and the data flow constraint parameter of the target service level includes a threshold of a burst amount of a data flow and a threshold of an average rate of the data flow. The determining an update value of the queue resource parameter of the target service level based on the update value of the data flow constraint parameter of the target service level when the maximum delay remains unchanged includes but is not limited to, when the maximum delay remains unchanged, determining a bandwidth of a port corresponding to the target service level, a maximum amount of data that can be forwarded at the target service level after the target service level is adjusted, a maximum amount of data that can be forwarded at each of a plurality of service levels of the first network device before the target service level is adjusted, and a maximum packet length of a queue corresponding to each of the plurality of service levels; determining the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted; and determining the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow.

It should be noted that the maximum amount of data that can be forwarded mentioned above is a maximum amount of data that can be forwarded in one round robin scheduling. For example, the maximum amount of data that can be forwarded at the target service level after the target service level is adjusted is a maximum amount of data that can be forwarded in one round robin scheduling after the target service level is adjusted. The maximum amount of data that can be forwarded at each of the plurality of service levels before the target service level is adjusted is a maximum amount of data that can be forwarded at each of the plurality of service levels in one round robin scheduling before the target service level is adjusted.

Figure 5:
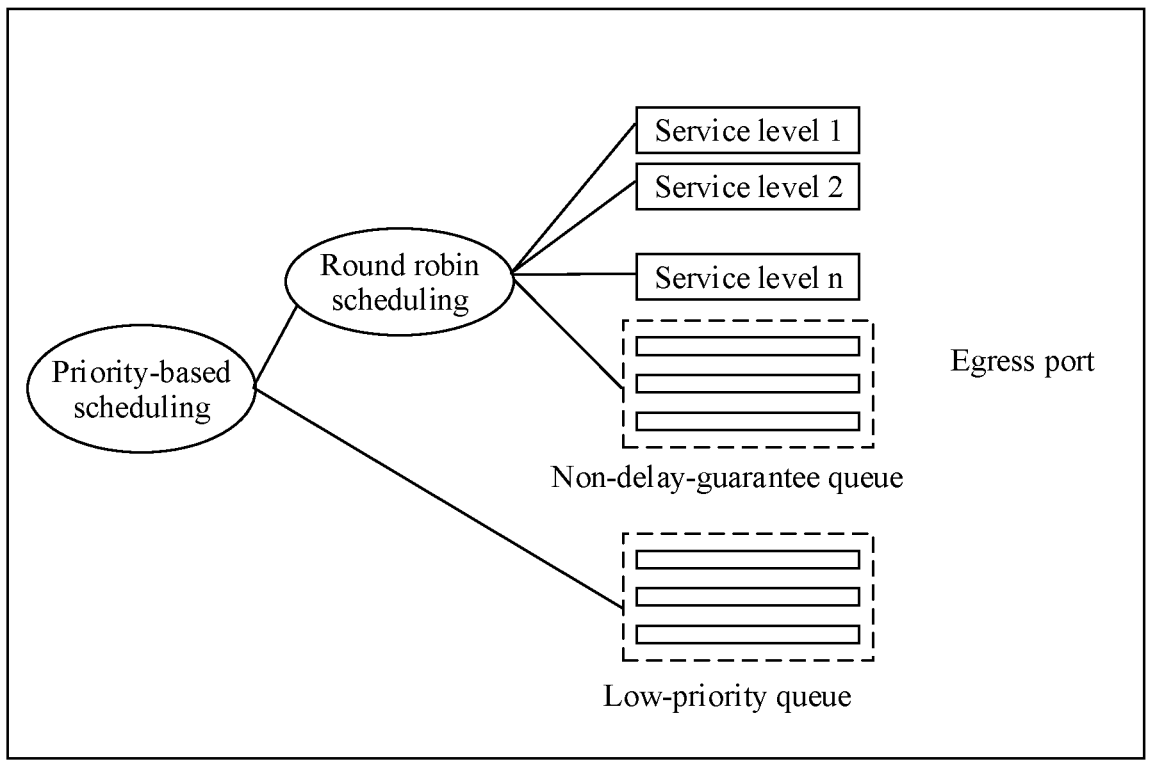
FIG. 5 is a schematic diagram of an egress port queue for adjusting a service level according to an embodiment of this application.

In an example embodiment, for example, an update configuration of a service level is calculated according to a network calculus theory. An egress port queue of the first network device is shown in FIG. 5. In FIG. 5, for example, a total of n service levels are set on an egress port, and each service level is bound to one queue. In addition, for example, there are several queues serving a data flow having no delay guarantee requirement. For brief description, one virtual queue is used to represent the queues having no delay guarantee requirement, and is referred to as a non-delay-guarantee queue. Queues corresponding to all the service levels and the non-delay-guarantee queue are scheduled through round robin. Optionally, there may be several low-priority queues. The queues corresponding to the service levels and the non-delay-guarantee queue are high-priority queues. At each scheduling opportunity, the high-priority queues can be scheduled first.

The determining the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted includes but is not limited to determining, based on the bandwidth of the port corresponding to the target service level, the maximum amount of data that can be forwarded at the target service level after the target service level is adjusted, and the maximum amount of data that can be forwarded at each of the plurality of service levels before the target service level is adjusted, the queue bandwidth $C_i^2$ of the target service level according to the following formula:

$$C_i^2 = C \frac{Q_i^2}{\sum_{1 \le j \le n, j \ne i} Q_j + Q_i^1 + Q_{n+1}^1}$$

Herein, C is the bandwidth of the port corresponding to the target service level, $Q_i^2$ is the maximum amount of data that can be forwarded at the target service level after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, and n is a positive integer greater than 1; and i and j are positive integers, i corresponds to the target service level, and j corresponds to the $j^{th}$ service level.

The determining the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow includes but is not limited to determining, based on the maximum amount of data that can be forwarded at each of the plurality of service levels before the target service level is adjusted, the maximum packet length of the queue corresponding to each of the plurality of service levels, the update value of the threshold of the burst amount of the data flow at the target service level, and the update value of the threshold of the average rate of the data flow, the queue buffer $BF_i^2$ of the target service level according to the following formula:

$$BF_i^2 = \left( \frac{L_{max,L} + \sum_{1 \le j \le n, j \ne i}(L_j + Q_j) + L_{n+1} + Q_{n+1}^2}{C} + \frac{L_i \left( \sum_{1 \le j \le n, j \ne i} Q_j + Q_{n+1}^2 \right)}{C Q_i^2} \right) * r_i^2 + b_i^2$$

Herein, $L_{max,L}$ is a maximum packet length of a low-priority queue, $L_{n+1}$ is a maximum packet length of a non-delay-guarantee queue, $L_j$ is a maximum packet length of a queue at a $j^{th}$ service level, $b_i^2$ is the update value of the threshold of the burst amount of the data flow, $r_i^2$ is the update value of the threshold of the average rate of the data flow, and $L_i$ is a maximum packet length of a queue at the target service level.

Figure 6:
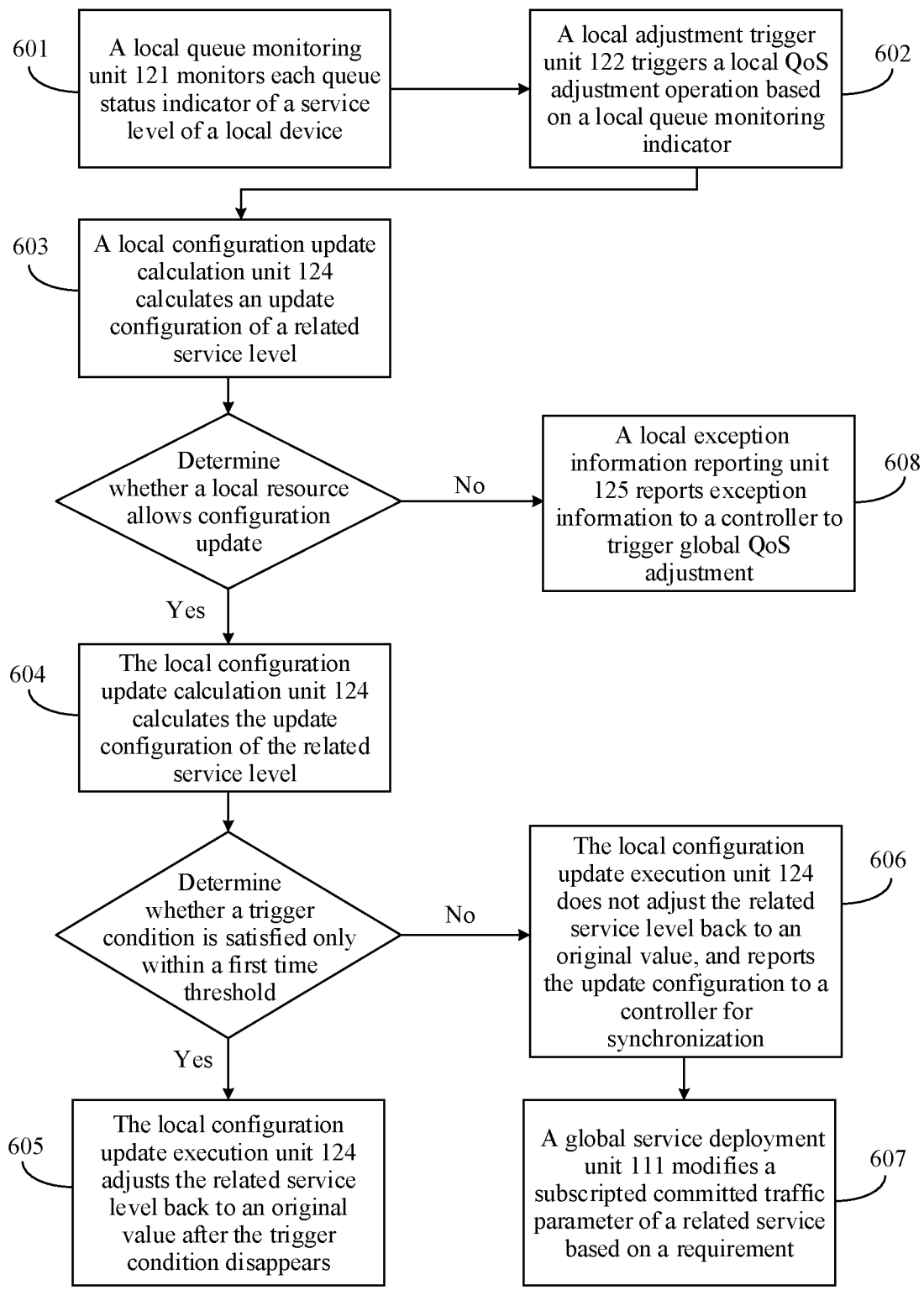
FIG. 6 is a schematic diagram of a service level adjustment procedure according to an embodiment of this application.

For a manner of obtaining the foregoing parameters used to determine the queue bandwidth $C_i^2$ of the target service level and the queue buffer $BF_i^2$ of the target service level, refer to related descriptions in a procedure shown in FIG. 6. Details are not described herein.

4022A: If the update value of the parameter of the target service level meets a constraint condition of a local target resource when the maximum delay remains unchanged, adjust the parameter of the target service level based on the update value of the parameter of the target service level, where the target resource is a resource that can be preempted by the target service level.

Based on a schematic diagram of the queue shown in FIG. 5, in this embodiment of this application, the target resource includes but is not limited to a resource that is of a non-delay-guarantee queue and that can be preempted. In an example, in the method provided in this embodiment of this application, if the target service level needs to be adjusted, the resource of the non-delay-guarantee queue can be preempted, to satisfy a resource required when the target service level is adjusted.

In an example embodiment, after the parameter of the target service level is adjusted based on the update value of the parameter of the target service level, when any queue status information does not exceed, within a first time-threshold, a second threshold upper limit corresponding to the any queue status information, the parameter of the target service level is adjusted from the update value back to a value existing before adjustment to the update value. In this embodiment of this application, neither a value of the first time-threshold nor the second threshold upper limit is limited. The second threshold upper limit may be the same as or different from the first threshold upper limit. The second threshold upper limit may be set based on experience, or may be adjusted based on an application scenario. In this case, when any queue status information does not exceed, within the first time-threshold, the second threshold upper limit corresponding to the any queue status information, the parameter of the target service level is adjusted from the update value back to the value existing before adjustment to the update value, so that the resource preempted by the target service level due to adjustment can be released.

In an example embodiment, after the parameter of the target service level is adjusted based on the update value of the parameter of the target service level, when any queue status information exceeds, within a first time threshold, a third threshold upper limit corresponding to the any queue status information, update information of the target service level is reported to a control device, where the update information includes the update value of the parameter of the target service level. The third threshold upper limit is not limited in this embodiment of this application. The third threshold upper limit may be the same as or different from the second threshold upper limit. The third threshold upper limit may be set based on experience, or may be adjusted based on an application scenario. In this case, after the target service level is adjusted, if the any queue status information exceeds, within the first time-threshold, the third threshold upper limit corresponding to the any queue status information, the update information of the target service level is reported to the control device, so that the control device can be triggered to perform global adjustment.

Case 2: The update value of the parameter of the target service level does not meet a constraint condition of a local target resource when the maximum delay remains unchanged. In Case 2, that the first network device adjusts the parameter of the target service level based on the maximum delay associated with the target service level includes but is not limited to two processes: 4021B and 4022B.

4021B: Determine the update value of the parameter of the target service level. For a manner of determining the update value of the parameter of the target service level in 4021B, refer to related descriptions in 4021A. Details are not described herein again.

4022B: If the update value of the parameter of the target service level does not meet a constraint condition of a local target resource when the maximum delay remains unchanged, report exception information to a control device.

For example, the exception information includes at least one of queue status information that exceeds a corresponding first threshold upper limit and an error signal indicating that a data flow exceeds an admission constraint. The queue status information includes but is not limited to queue buffer occupation, a packet queuing delay, and queue packet count information.

4023B: Receive a first adjustment value that is of the parameter of the target service level and that is sent by the control device, where the first adjustment value is obtained based on the exception information.

In 4022B, when the update value of the parameter of the target service level does not meet the constraint condition of the local target resource when the maximum delay remains unchanged, the exception information is reported to the control device. Therefore, the control device may adjust the parameter of the target service level of the first network device based on the exception information. A manner in which the control device obtains the first adjustment value of the parameter of the target service level based on the exception information is not limited in this embodiment of this application, provided that the constraint condition of the local target resource can be met when the maximum delay remains unchanged.

4024B: Adjust the parameter of the target service level based on the first adjustment value of the parameter of the target service level. In this case, the first adjustment value of the parameter of the target service level is determined by the control device. After receiving the first adjustment value, the network device adjusts the parameter of the target service level based on the first adjustment value. The first adjustment value of the parameter of the target service level includes but is not limited to an adjustment value of each parameter of the target service level. An example in which the parameter of the target service level includes a queue resource parameter and a data flow constraint parameter is still used. The first adjustment value of the parameter of the target service level includes a first adjustment value of the queue resource parameter of the target service level and a first adjustment value of the data flow constraint parameter of the target service level. The first network device adjusts the queue resource parameter based on the first adjustment value of the queue resource parameter, and adjusts the data flow constraint parameter based on the first adjustment value of the data flow constraint parameter.

In addition to sending the adjustment value of the parameter of the target service level after the first network device reports the exception information, the control device may further adjust the parameter of the target service level of the first network device based on another factor. Therefore, the method provided in this embodiment of this application further includes that the first network device receives a second adjustment value that is of the parameter of the target service level and that is sent by the control device. The first network device adjusts the parameter of the target service level based on the second adjustment value of the parameter of the target service level. A manner of determining the second adjustment value of the parameter of the target service level is not limited in this embodiment of this application. The second adjustment value may be the same as or different from the first adjustment value. Values of the first adjustment value and the second adjustment value are not limited in this embodiment of this application.

According to the method provided in this embodiment of this application, when the queue status information at the target service level exceeds the corresponding first threshold upper limit, the first network device adjusts the parameter of the target service level, so that network resource utilization is further improved while an end-to-end delay of a service is ensured. In addition, because the first network device adjusts the parameter of the target service level based on the maximum delay associated with the target service level, it can be ensured that delay degradation or a packet loss is not caused by network traffic.

Based on the method procedure shown in FIG. 4, the system architecture shown in FIG. 3 is used as an example to describe, by using a process of interaction between the first network device and the controller, the method for dynamically adjusting a service level provided in this embodiment of this application. As shown in FIG. 6, the method includes the following processes 601 to 608.

601: A local queue monitoring unit 121 of a first network device monitors queue status information at a plurality of service levels of the local device in real time.

For example, the local queue monitoring unit 121 of the first network device monitors queue status information such as local queue buffer occupation, a packet queuing delay, and a queue packet count of each of the plurality of service levels.

602: Based on 601, a local adjustment trigger unit 122 determines, based on the queue status information, to trigger local QoS adjustment, that is, determines to trigger update of a parameter of a service level of a related queue.

For example, if it is detected that queue buffer occupation of a local target service level exceeds a first threshold upper limit of the queue buffer occupation, a queue packet queuing delay exceeds a first threshold upper limit of the queue packet queuing delay, or a quantity of arriving packets per unit time exceeds a first threshold upper limit of the queue packet count, the local adjustment trigger unit 122 determines that a quantity of actually arriving data flows in the target service level exceeds a quantity of data flows that is specified in a data flow admission constraint, and further triggers configuration update of parameters such as a queue resource and data flow admission of the target service level in an increasing direction. For example, because a burst amount, an average rate, and the like of a data flow actually sent by a service respectively exceed parameters such as a threshold of a burst amount of a data flow that is allowed to be sent according to a subscription commitment and a threshold of an average rate of the data flow, the quantity of actually arriving data flows in the target service level exceeds the quantity of data flows that is specified in the data flow admission constraint. The target service level is any one of the plurality of service levels of the first network device.

603: Based on 602, a local configuration update calculation unit 123 calculates an update value of the parameter of the target service level, including an update value of a queue resource parameter and an update value of a data flow constraint parameter.

The queue resource parameter includes a queue bandwidth, a queue buffer, and the like. The data flow constraint parameter includes a threshold of a burst amount of a data flow, a threshold of an average rate of the data flow, and the like.

In an example embodiment, the local configuration update calculation unit 123 calculates, based on a quantity of actually arriving data flows that exceeds a current data flow admission constraint, data flow admission that is of the target service level and that needs to be additionally added, including but not limited to a threshold that is of a burst amount of a data flow and that needs to be added, a threshold that is of an average rate of the data flow and that needs to be added, and the like; and calculates, when an associated maximum delay remains unchanged, a queue resource that is of the target service level and that needs to be correspondingly added, including but not limited to a queue bandwidth, a queue buffer, or the like that needs to be added.

For example, if the local configuration update calculation unit 123 calculates an update configuration of a service level according to a network calculus theory, a principle is shown in the schematic diagram of the egress port queue shown in FIG. 5. It is considered that a total of n service levels are set on an egress port, and each service level is bound to one queue. In addition, it is considered that there are several queues serving a data flow having no delay guarantee requirement. For brief description, one virtual queue is used to represent the queues having no delay guarantee requirement, and is referred to as a non-delay-guarantee queue. Queues corresponding to all the service levels and the non-delay-guarantee queue are scheduled through round robin. Optionally, there may be several low-priority queues. Correspondingly, the queues corresponding to the service levels and the non-delay-guarantee queue are high-priority queues. At each scheduling opportunity, the high-priority queues can be scheduled first.

The maximum amount of data is a maximum amount of data that can be forwarded in one scheduling in a round robin scheduling process of a queue. For example, the target service level is an $i^{th}$ service level. In round robin scheduling in a high-priority queue, a maximum amount of data that can be forwarded in one scheduling at the $i^{th}$ service level is $Q_i$, and a maximum amount of data that can be forwarded in one round robin scheduling in a non-delay-guarantee queue is $Q_{n+1}$.

Figure 7:
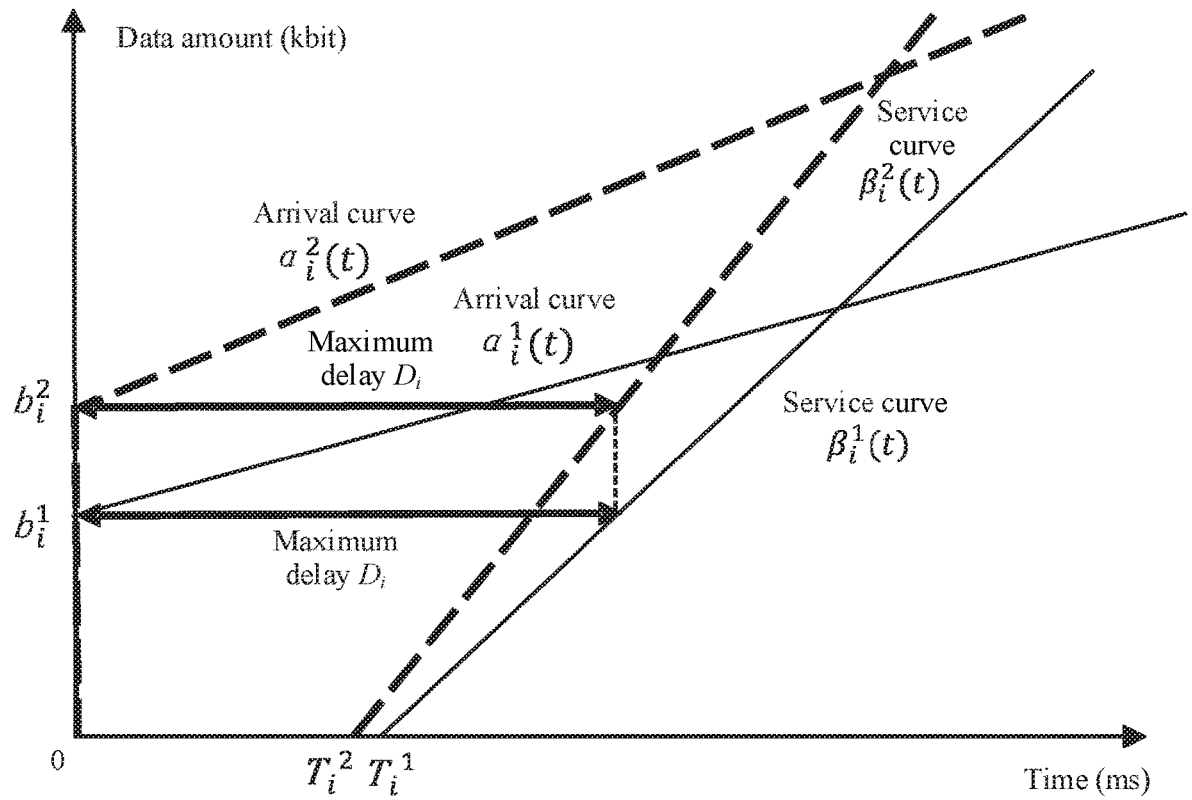
FIG. 7 is a schematic diagram of network calculus for adjusting a service level according to an embodiment of this application.

As shown in FIG. 7, an arrival curve function of an $i^{th}$ service level is $\alpha_i(t)$, an independent variable is t, and in an interval $t_2-t_1$ between any moments $t_1$ and $t_2$ ($t_2 \geq t_1 \geq 0$), an amount of data arriving at the $i^{th}$ service level does not exceed $\alpha_i(t_2-t_1)$. For example, an amount of accumulated data in a queue at the $i^{th}$ service level from a moment 0 to a moment t is $A_i(t)$. If a function $\alpha_i(t)$ exists, $A_i(t_2)-A_i(t_1) \leq \alpha_i(t_2-t_1)$ is satisfied for the any moments $t_1$ and $t_2$ ($t_2 \geq t_1 \geq 0$). In this case, the function $\alpha_i(t)$ is the arrival curve function of the $i^{th}$ service level.

In addition, a service curve function of the $i^{th}$ service level is $\beta_i(t)$, an independent variable is t, and in the interval $t_2-t_1$ between the any moments $t_1$ and $t_2$ ($t_2 \geq t_1 \geq 0$), an amount of data successfully forwarded at the service level is not less than $\beta_i(t_2-t_1)$. For example, an amount of accumulated data sent in the queue at the $i^{th}$ service level from the moment 0 to the moment t is $B_i(t)$. If a function $\beta_i$ (t) exists, $B_i(t_2)-B_i(t_1) \geq \beta_i(t_2-t_1)$ is satisfied for the any moments $t_1$ and $t_2$ ($t_2 \geq t_1 \geq 0$). In this case, the function $\beta_i(t)$ is the service curve function of the $i^{th}$ service level.

For example, the target service level is an $i^{th}$ service level. A maximum delay generated by a packet passing through the $i^{th}$ service level may be represented as $D_i = \sup_{t \geq 0} \{\inf\{d \geq 0 | \alpha_i(t) \leq \beta_i(t+d)\}\}$. For example, a bandwidth of the port is C, a maximum delay requirement of the $i^{th}$ service level is $D_i$, and a maximum packet length of a queue corresponding to the $i^{th}$ service level is $L_i$. In addition, a maximum packet length of a non-delay-guarantee queue is $L_{n+1}$, and a maximum packet length of a low-priority queue is $L_{max,L}$. If configuration update needs to be performed on the $i^{th}$ service level, a maximum amount of data that can be forwarded at the $i^{th}$ service level each time before the configuration update is $Q_i^1$, and a maximum amount of data that can be forwarded in the non-delay-guarantee queue is $Q_{n+1}^1$. Before the configuration update of the $i^{th}$ service level, an egress bandwidth of the $i^{th}$ service level is $C_i^1 = C * Q_i^1 / (Q_i^1 + \sum_{1 \leq j \leq n, j \neq i} Q_j)$. Correspondingly, before the configuration update of the $i^{th}$ service level, a threshold that is of the $i^{th}$ service level and that is of a burst amount of a data flow is $b_i^1$, and an average rate is $r_i^1$. As shown in FIG. 7, $\alpha_i^1(t)$ represents an arrival curve existing before the update of the $i^{th}$ service level. In this case, a service curve $\beta_i^1(t)$ of the $i^{th}$ service level is represented as follows:

$$\beta_i^1(t) = \left( C \frac{Q_i^1}{Q_i^1 + \sum_{1 \leq j \leq n, j \neq i} Q_j + Q_{n+1}^1} \right.$$

$$\left( t - \frac{L_{max,L} + \sum_{1 \leq j \leq n, j \neq i}(L_j + Q_j) + L_{n+1} + Q_{n+1}^1}{C} \right.$$

$$\left. \left. - \frac{L_i\left(\sum_{1 \leq j \leq n, j \neq i} Q_j + Q_{n+1}^1\right)}{C Q_i^1} - T_0 \right) \right)^+ \quad (1)$$

Herein, $$\left( C \frac{Q_i^1}{Q_i^1 + \sum_{1 \leq j \leq n, j \neq i} Q_j + Q_{n+1}^1} \right.$$

$$\left( t - \frac{L_{max,L} + \sum_{1 \leq j \leq n, j \neq i}(L_j + Q_j) + L_{n+1} + Q_{n+1}^1}{C} \right.$$

$$\left. \left. - \frac{L_i\left(\sum_{1 \leq j \leq n, j \neq i} Q_i + Q_{n+1}^1\right)}{C Q_i^1} - T_0 \right) \right)^+$$

is to obtain a larger value in a value of $$C \frac{Q_i^1}{Q_i^1 + \sum_{1 \leq j \leq n, j \neq i} Q_j + Q_{n+1}^1}$$

$$\left( t - \frac{L_{max,L} + \sum_{1 \leq j \leq n, j \neq i}(L_j + Q_j) + L_{n+1} + Q_{n+1}^1}{C} \right.$$

$$\left. - \frac{L_i\left(\sum_{1 \leq j \leq n, j \neq i} Q_i + Q_{n+1}^1\right)}{C Q_i^1} - T_0 \right)$$

and 0, where $T_0$ is a time offset. For example, if the maximum delay $D_i$ is a delay of transmitting a data flow by a single network device that includes a queuing delay, a processing delay, and a sending delay, $T_0$ is defined as a sum of the processing delay and the sending delay of the network device. For example, if the maximum delay $D_i$ is a queuing delay, $T_0$ is defined as 0.

A horizontal coordinate intercept of $\beta_i^1(t)$ is $T_i^1$, and a slope is $R_i^1$. According to Formula (1), details are as follows:

$$T_i^1 = \frac{L_{max,L} + \sum_{1 \leq j \leq n, j \neq i}(L_j + Q_j) + L_{n+1} + Q_{n+1}^1}{C} + \quad (2)$$

$$\frac{L_i\left(\sum_{1 \leq j \leq n, j \neq i} Q_j + Q_{n+1}^1\right)}{C Q_i^1} + T_0$$

-continued $$R_i^1 = C \frac{Q_i^1}{Q_i^1 + \sum_{1 \le j \le n, j \ne i} Q_j + Q_{n+1}^1} \quad (3)$$

In addition, a value of the maximum delay $D_i$ of the $i^{th}$ service level is represented as follows:

$$D_i = T_i^1 + \frac{b_i^1}{R_i^1} \quad (4)$$

According to Formula (2), Formula (3), and Formula (4), the value of the maximum delay $D_i$ of the $i^{th}$ service level is re-represented as follows:

$$D_i = \frac{L_{max,L} + \sum_{1 \le j \le n, j \ne i}(L_j + Q_j) + L_{n+1} + Q_{n+1}^1}{C} + \frac{L_i\left(\sum_{1 \le j \le n, j \ne i} Q_j + Q_{n+1}^1\right)}{CQ_i^1} + \frac{b_i^1\left(Q_i^1 + \sum_{1 \le j \le n, j \ne i} Q_j + Q_{n+1}^1\right)}{CQ_i^1} + T_0 \quad (5)$$

Correspondingly, before the configuration update, a minimum queue buffer size $BF_i^1$ required by the $i^{th}$ service level to meet a requirement of the value of the maximum delay $D_i$ is represented as follows:

$$BF_i^1 = \left(\frac{L_{max,L} + \sum_{1 \le j \le n, j \ne i}(L_j + Q_j) + L_{n+1} + Q_{n+1}^1}{C} + \frac{L_i\left(\sum_{1 \le j \le n, j \ne i} Q_j + Q_{n+1}^1\right)}{CQ_i^1}\right) * r_i^1 + b_i^1 \quad (6)$$

If the local configuration update calculation unit 123 calculates that a threshold that is of the $i^{th}$ service level, that is of a burst amount of a data flow, and that needs to be newly added is $\Delta b_i$, an updated threshold of the burst amount of the data flow is $b_i^2 = b_i^1 + \Delta b_i$, and if a threshold that is of an average rate of the data flow and that needs to be newly added is $\Delta r_i$, an updated threshold of the average rate of the data flow is $r_i^2 = r_i^1 + \Delta r_i$. After the configuration update of the $i^{th}$ service level, as shown in FIG. 7, $\beta_i^2(t)$ represents a service curve obtained after the update of the $i^{th}$ service level, a horizontal coordinate intercept of $\beta_i^2(t)$ is $T_i^2$, and $\alpha_i^2(t)$ represents an arrival curve obtained after the update of the $i^{th}$ service level. In this case, the value of the maximum delay $D_i$ of the $i^{th}$ service level remains unchanged, and may be re-represented as follows:

$$D_i = \frac{L_{max,L} + \sum_{1 \le j \le n, j \ne i}(L_j + Q_j) + L_{n+1} + Q_{n+1}^1}{C} + \frac{L_i\left(\sum_{1 \le j \le n, j \ne i} Q_j + Q_{n+1}^2\right)}{CQ_i^2} + \frac{b_i^2\left(Q_i^2 + \sum_{1 \le j \le n, j \ne i} Q_j + Q_{n+1}^2\right)}{CQ_i^2} + T_0 \quad (7)$$

Herein, $Q_i^2$ is a newly calculated maximum amount of data that can be forwarded when the $i^{th}$ service level is scheduled, that is, a maximum amount of data that can be forwarded at the target service level after the target service level is adjusted, and $Q_{n+1}^2$ is a newly calculated maximum amount of data that can be forwarded in the non-delay-guarantee queue, that is, a maximum amount of data that can be forwarded in the non-delay-guarantee queue after the target service level is adjusted. To ensure that a delay requirement of another service level is not affected after the configuration update of the $i^{th}$ service level, the following constraint needs to be ensured:

$$Q_i^1 Q_{n+1}^1 = Q_i^2 Q_{n+1}^2 \quad (8)$$

According to Formula (5), Formula (7), and Formula (8), the maximum amount $Q_i^2$ of data that can be forwarded when the $i^{th}$ service level is scheduled after the configuration update may be calculated as follows:

$$Q_i^2 = \frac{(Q_i^1)^2 - (L_i + b_i^1)\left(\sum_{1 \le j \le n, j \ne i} Q_j + Q_i^1 + Q_{n+1}^1\right)}{2Q_i^1} + \sqrt{\frac{\left[(L_i + b_i^1)\left(\sum_{1 \le j \le n, j \ne i} Q_j + Q_i^1 + Q_{n+1}^1\right) - (Q_i^1)^2\right]^2}{4(Q_i^1)^2} + (L_i + b_i^2)\left(\sum_{1 \le j \le n, j \ne i} Q_j + Q_i^1 + Q_{n+1}^1\right)} \quad (9)$$

According to Formula (8) and Formula (9), the maximum amount $Q_{n+1}^2$ of data scheduled in the non-delay-guarantee queue each time after the update is represented as follows:

$$Q_{n+1}^2 = Q_i^1 + Q_{n+1}^1 - \frac{(Q_i^1)^2 - (L_i + b_i^1)\left(\Sigma_{1 \le i \le \Pi i \ne i} Q_j + Q_i^1 + Q_{n+1}^1\right)}{2Q_i^1} - \sqrt{\frac{\left[(L_i + b_i^1)\left(\sum_{1 \le j \le n, j \ne i} Q_j + Q_i^1 + Q_{n+1}^1\right) - (Q_i^1)^2\right]^2}{4(Q_i^1)^2} + (L_i + b_i^2)\left(\sum_{1 \le j \le n, j \ne i} Q_j + Q_i^1 + Q_{n+1}^1\right)} \quad (10)$$

According to Formula (8) and Formula (9), an updated queue bandwidth of the $i^{th}$ service level is calculated as follows:

$$C_i^2 = C \frac{Q_i^2}{\sum_{1 \le j \le n, j \ne i} Q_j + Q_i^1 + Q_{n+1}^1} \quad (11)$$

According to Formula (6), Formula (8), and Formula (9), after the configuration update, a minimum queue buffer size $BF_i^2$ required by the $i^{th}$ service level is calculated as follows:

$$BF_i^2 = \left( \frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_i^2} \right) * r_i^2 + b_i^2 \quad (12)$$

604: Based on 603, if a local resource can support configuration update based on a calculation result, a local configuration update execution unit 124 implements corresponding configuration update on the target service level.

In an example embodiment, if resources such as a bandwidth and a buffer that can be currently preempted by a non-delay-guarantee queue on a same port of the first network device are sufficient to meet a requirement of a queue resource that is of a related service level and that needs to be additionally added, the local configuration update execution unit 124 preempts a corresponding resource of the non-delay-guarantee queue, transfers the resource to the target service level, and performs configuration update on the target service level based on a new queue bandwidth and buffer requirement.

For example, based on the calculation result of the network calculus theory in 603, the local configuration update execution unit 124 performs the following determining to determine whether to perform the configuration update based on the calculation result. It is defined that a maximum bandwidth resource that can be currently preempted by the non-delay-guarantee queue is $\Delta C_{n+1}$, and a maximum buffer resource that can be currently preempted by the non-delay-guarantee queue is $\Delta BF_{n+1}$. In this case, when the local configuration update execution unit 124 performs the configuration update, the following two conditions need to be met:

$$C_{n+1}^1 - C_{n+1}^2 = C_i^2 - C_i^1 = C \frac{Q_i^2 - Q_i^1}{\sum_{1 \le j \le n, j \ne i} Q_j + Q_i^1 + Q_{n+1}^1} \le \Delta C_{n+1} \quad (13)$$

$$BF_{n+1}^1 - BF_{n+1}^2 = BF_i^2 - BF_i^1 \le \Delta B_{n+1} \quad (14)$$

605: Based on 604, if it is determined that a condition for triggering local adjustment is satisfied only within a first time-threshold, the local configuration update execution unit 124 actively adjusts, after the trigger condition disappears, the parameter of the related service level from the update value back to a value existing before adjustment to the update value.

In an example embodiment, if it is detected that the queue status information such as queue buffer occupation, a packet queuing delay, or a queue packet count exceeds a corresponding first threshold upper limit only within the first time-threshold, and then is restored to a normal range, it is determined that an actually arriving data flow exceeds a current admission constraint only in a short term. In this case, the first network device does not need to report configuration update information to the controller for synchronization, and after the queue status information is restored to normal, the first network device actively adjusts the parameter of the related service level from the update value back to the value existing before adjustment to the update value.

606: Based on 604, if it is determined that a condition for triggering local adjustment is satisfied not only within a first time-threshold, the local configuration update execution unit 124 does not actively adjust the parameter of the target service level from the update value back to a value existing before adjustment to the update value, but reports update information of the target service level to the controller.

The update information includes but is not limited to update values of parameters such as a queue resource parameter (including a queue bandwidth, a queue buffer, and the like) and a data flow constraint parameter (including a threshold of a burst amount of a data flow, a threshold of an average rate of the data flow, and the like). A global service level maintenance unit 116 of the controller performs database synchronization on the update information, and subsequently the controller performs service deployment based on a new service level configuration.

In an example embodiment, if it is detected that a time period for which the queue status information such as queue buffer occupation, a packet queuing delay, or a queue packet count exceeds a corresponding first threshold upper limit exceeds an interval such as the first time threshold, it is determined that an actually arriving data flow exceeds a current admission constraint in a long term. In this case, after a real-time configuration update operation, the device does not actively adjust the parameter of the target service level from the update value back to the value existing before adjustment to the update value, but reports the update information to the controller, and the global service level maintenance unit 116 performs synchronization on the update information.

607: Based on 606, a global service deployment unit 111 modifies a subscribed committed data flow parameter of a related service based on an actual arrival status and a requirement, including modifying a threshold of a burst amount of a data flow, a threshold of an average rate of the data flow, and the like, and modifies a current data flow parameter and a remaining data flow parameter of each service level based on an update configuration of the target service level and a requirement. The current data flow parameter includes an average rate and/or a burst amount of a current data flow, and the remaining data flow parameter includes an average rate and/or a burst amount of a remaining data flow. The current data flow parameter and the remaining data flow parameter may be calculated based on a traffic model, or may be obtained based on a real-time data flow status.

In an example embodiment, the global service deployment unit 111 modifies, in an increasing direction based on an actual arrival status, a parameter of a data flow that exceeds a subscription commitment in the target service level, including modifying a threshold of a burst amount of a data flow, a threshold of an average rate of the data flow, and the like in an increasing direction.

608: Based on 603, if a local resource cannot support configuration update based on a calculation result, a local exception information reporting unit 125 reports QoS adjustment exception information, that is, exception information, to the controller, and a global adjustment trigger unit 113 of the controller triggers a global QoS adjustment operation.

For example, communication between the controller and the network device is implemented by using the Network Configuration Protocol (NETCONF). Therefore, the local exception information reporting unit 125 reports the QoS adjustment exception information to the controller by using NETCONF.

In an example embodiment, if resources such as a bandwidth and a buffer that are of a non-delay-guarantee queue and that can be preempted on a same port of the first network device are insufficient to meet a requirement of a queue resource that is of the target service level and that needs to be additionally added, and it cannot be ensured, by preempting the resources of the non-delay-guarantee queue, that the target service level still meets a specified maximum delay requirement, the local exception information reporting unit 125 uses queue status information such as queue buffer occupation, a packet queuing delay, or queue packet count information that exceeds a corresponding first threshold upper limit, an error signal indicating that a data flow exceeds an admission constraint, and the like as exception information, and reports the exception information to the controller in real time.

The controller may return a first adjustment value of the parameter of the target service level to the first network device based on the exception information reported by the first network device. Therefore, the first network device adjusts the parameter of the target service level based on the first adjustment value of the parameter of the target service level.

It should be noted that in FIG. 4 and FIG. 6, a method for dynamically adjusting a service level of a first network device by the first network device is used as an example for description. Another network device connected to a control device such as a controller may adjust a service level by using the adjustment method performed by the first network device. In other words, in addition to the first network device, the method provided in embodiments of this application may be further applied to a second network device that has a same or similar function as the first network device.

An embodiment of this application provides a service-level-based system for dynamically adjusting QoS, so that network resource utilization can be further improved while an end-to-end delay requirement of a service is ensured. When QoS is dynamically adjusted, this embodiment of this application can ensure that delay degradation or a packet loss is not caused by a data flow in a network.

FIG. 3 shows a service-level-based system for dynamically adjusting QoS that ensures an end-to-end delay, to improve network resource utilization while ensuring an end-to-end delay of a service. An overall architecture of the system includes units on a controller side and a network device side, related functions of the units, and interaction logic between the units.

An overall working procedure includes steps such as a QoS adjustment procedure locally triggered by the network device, corresponding original information collection, trigger determining adjustment, calculation adjustment, execution adjustment, and information synchronization adjustment, so that based on changes of a service deployment status, an actual arrival status of a data flow, queue status information, and the like, configuration update can be dynamically performed on the parameter of the service level, and a service level through which the data flow passes can be dynamically switched. Therefore, delay degradation or a packet loss of the data flow in a network is not caused during the dynamic configuration update of the service level or the switching of the service level of the data flow.

The configuration update of the parameter of service level includes one or more of the following parameters such as increasing or reducing allocation of queue resources, for example, a queue bandwidth and a queue buffer; and increasing or decreasing a value of a data flow constraint parameter, for example, a threshold of a burst amount of a data flow and a maximum average rate of the data flow. The switching of the service level through which the data flow passes includes switching to another service level on a same port of a same device; or switching to a service level on another port of a same device or of another device.

An embodiment of this application provides a service level adjustment apparatus. The apparatus is configured to perform, by using modules shown in FIG. 8, the method performed by the network device in FIG. 4 or FIG. 6. Refer o FIG. 8. The apparatus includes an obtaining unit 801 and an adjustment unit 802.

The obtaining unit 801 is configured to obtain at least one piece of queue status information at a target service level. For example, for functions performed by the obtaining unit 801, refer to related descriptions of step 401 shown in FIG. 4. Details are not described herein again.

The adjustment unit 802 is configured to, when any one of the at least one piece of queue status information exceeds a first threshold upper limit corresponding to the any queue status information, adjust a parameter of the target service level based on a maximum delay associated with the target service level. For example, for functions performed by the adjustment unit 802, refer to related descriptions of step 402 shown in FIG. 4. Details are not described herein again.

In a possible implementation, the adjustment unit 802 is configured to determine an update value of the parameter of the target service level; and if the update value of the parameter of the target service level meets a constraint condition of a local target resource when the maximum delay remains unchanged, adjust the parameter of the target service level based on the update value of the parameter of the target service level, where the target resource is a resource that can be preempted by the target service level.

In a possible implementation, the adjustment unit 802 is further configured to, when \ any queue status information does not exceed a second threshold upper limit within a first time threshold, adjust the parameter of the target service level from the update value back to a value existing before adjustment to the update value.

In a possible implementation, the apparatus further includes a reporting unit, configured to, when any queue status information exceeds a third threshold upper limit within a first time threshold, report update information of the target service level to a control device, where the update information includes the update value of the parameter of the target service level.

In a possible implementation, the adjustment unit 802 is configured to determine an update value of the parameter of the target service level; if the update value of the parameter of the target service level does not meet a constraint condition of a local target resource when the maximum delay remains unchanged, report exception information to a control device, where the exception information includes at least one of queue status information that exceeds the corresponding first threshold upper limit and an error signal indicating that a data flow exceeds an admission constraint, and the target resource is a resource that can be preempted by the target service level; receive a first adjustment value that is of the parameter of the target service level and that is sent by the control device, where the first adjustment value is obtained based on the exception information; and adjust the parameter of the target service level based on the first adjustment value of the parameter of the target service level.

In a possible implementation, the parameter of the target service level includes a queue resource parameter and a data flow constraint parameter. The adjustment unit 802 is configured to determine an update value of the data flow constraint parameter of the target service level based on an actually arriving data flow; and determine an update value of the queue resource parameter of the target service level based on the update value of the data flow constraint parameter of the target service level when the maximum delay remains unchanged.

In a possible implementation, the queue resource parameter of the target service level includes a queue bandwidth and a queue buffer, and the data flow constraint parameter of the target service level includes a threshold of a burst amount of a data flow and a threshold of an average rate of the data flow.

The adjustment unit 802 is configured to, when the maximum delay remains unchanged, determine a bandwidth of a port corresponding to the target service level, a maximum amount of data that can be forwarded at the target service level after the target service level is adjusted, a maximum amount of data that can be forwarded at each of a plurality of service levels of the first network device before the target service level is adjusted, and a maximum packet length of a queue corresponding to each of the plurality of service levels; determine the queue bandwidth of the target service level based on the bandwidth of the port corresponding to the target service level, the maximum amount of data that can be forwarded at the target service level after the target service level is adjusted, and the maximum amount of data that can be forwarded at each of the plurality of service levels before the target service level is adjusted; and determine the queue buffer of the target service level based on the maximum amount of data that can be forwarded at each of the plurality of service levels before the target service level is adjusted, the maximum packet length of the queue corresponding to each of the plurality of service levels, an update value of a threshold of a burst amount of a data flow at the target service level, and an update value of a threshold of an average rate of the data flow.

In a possible implementation, the adjustment unit 802 is configured to determine, based on the bandwidth of the port corresponding to the target service level, the maximum amount of data that can be forwarded at the target service level after the target service level is adjusted, and the maximum amount of data that can be forwarded at each of the plurality of service levels before the target service level is adjusted, the queue bandwidth $C_i^2$ of the target service level according to the following formula:

$$C_i^2 = C \frac{Q_i^2}{\sum_{1 \le j \le n, j \ne i} Q_j + Q_i^1 + Q_{n+1}^1}$$

Herein, C is the bandwidth of the port corresponding to the target service level, $Q_i^2$ is the maximum amount of data that can be forwarded at the target service level after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, and n is a positive integer greater than 1.

In a possible implementation, the adjustment unit is configured to determine, based on the maximum amount of data that can be forwarded at each of the plurality of service levels before the target service level is adjusted, the maximum packet length of the queue corresponding to each of the plurality of service levels, the update value of the threshold of the burst amount of the data flow at the target service level, and the update value of the threshold of the average rate of the data flow, the queue buffer $BF_i^2$ of the target service level according to the following formula:

$$BF_i^2 = \left( \frac{L_{max,L} + \sum_{1 \le j \le n, j \ne i} (L_j + Q_j) + L_{n+1} + Q_{n+1}^2}{C} + \frac{L_i \left( \sum_{1 \le j \le n, j \ne i} Q_j + Q_{n+1}^2 \right)}{CQ_i^2} \right) * r_i^2 + b_i^2$$

Herein, C is the bandwidth of the port corresponding to the target service level, $Q_i^2$ is the maximum amount of data that can be forwarded at the target service level after the target service level is adjusted, $Q_j$ is a maximum amount of data that can be forwarded at a $j^{th}$ service level, $Q_i^1$ is a maximum amount of data that can be forwarded before the target service level is adjusted, $Q_{n+1}^1$ is a maximum amount of data that can be forwarded in a non-delay-guarantee queue before the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_i^2$ is the update value of the threshold of the burst amount of the data flow, $r_i^2$ is the update value of the threshold of the average rate of the data flow, $L_i$ is a maximum packet length of a queue at the target service level, and n is a positive integer greater than 1.

In a possible implementation, the apparatus further includes a receiving unit, configured to receive a second adjustment value that is of the parameter of the target service level and that is sent by the control device; and the adjustment unit 802 is further configured to adjust the parameter of the target service level based on the second adjustment value of the parameter of the target service level.

According to the apparatus provided in this embodiment of this application, when the queue status information at the target service level exceeds the corresponding first threshold upper limit, the apparatus adjusts the parameter of the target service level, so that network resource utilization is further improved while an end-to-end delay of a service is ensured. In addition, because the apparatus adjusts the parameter of the target service level based on the maximum delay associated with the target service level, it can be ensured that delay degradation or a packet loss is not caused by network traffic.

Figure 8:
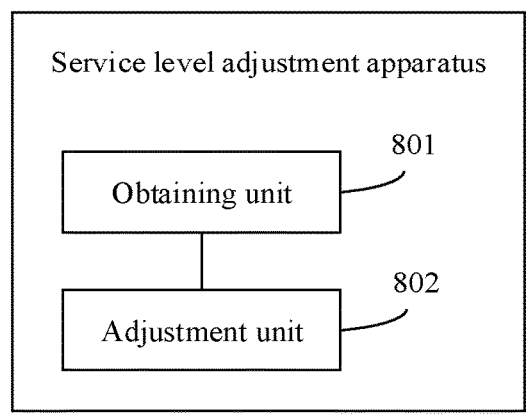
FIG. 8 is a schematic diagram of a structure of a service level adjustment apparatus according to an embodiment of this application.

It should be understood that, when the apparatus provided in FIG. 8 implements functions of the apparatus, division into the foregoing functional modules is merely used as an example for description. In actual application, the foregoing functions may be allocated to different functional modules for implementation based on a requirement. In other words, a device is divided into different functional modules in terms of an inner structure, to implement all or some of the functions described above. In addition, the apparatus provided in the foregoing embodiment and the method embodiments pertain to a same concept. For an implementation process of the apparatus, refer to the method embodiments. Details are not described herein again.

Figure 9:
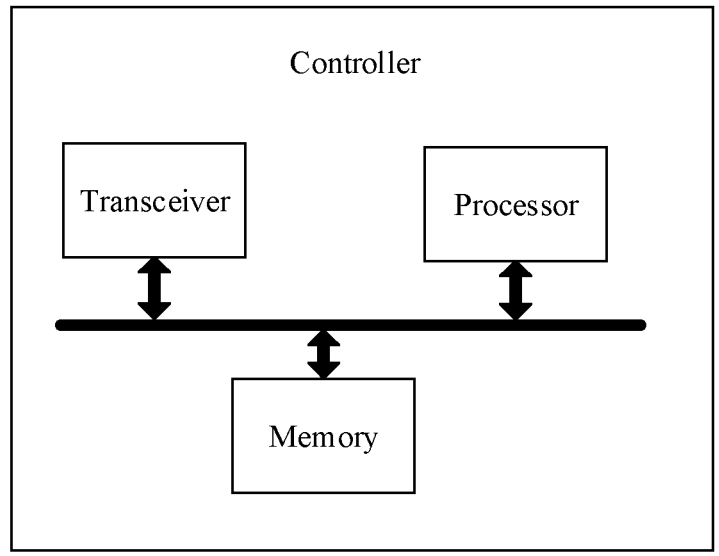
FIG. 9 is a schematic diagram of a structure of a network device according to an embodiment of this application.

The control device or the network device in the foregoing embodiments may be a router or a switch. There are two types of hardware structures:

1. As shown in FIG. 9, the control device or the network device includes a transceiver, a processor, and a memory. For the network device, the transceiver of the network device is configured to receive a packet, data information, or the like. For example, as described in 4022B shown in FIG. 4, the transceiver reports the exception information to the control device. Alternatively, the transceiver is configured to perform step 606 shown in FIG. 6, to report the update information of the target service level to the controller. Alternatively, the transceiver is configured to perform step 608 shown in FIG. 6, to report the exception information to the controller. The processor is configured to perform processing-related steps of the first network device in the foregoing embodiment. For example, the processor performs processing steps 401 and 402 that are performed by the first network device shown in FIG. 4. For another example, the processor performs processing steps 601 to 605 and step 607 that are performed by the first network device shown in FIG. 6.

Figure 10:
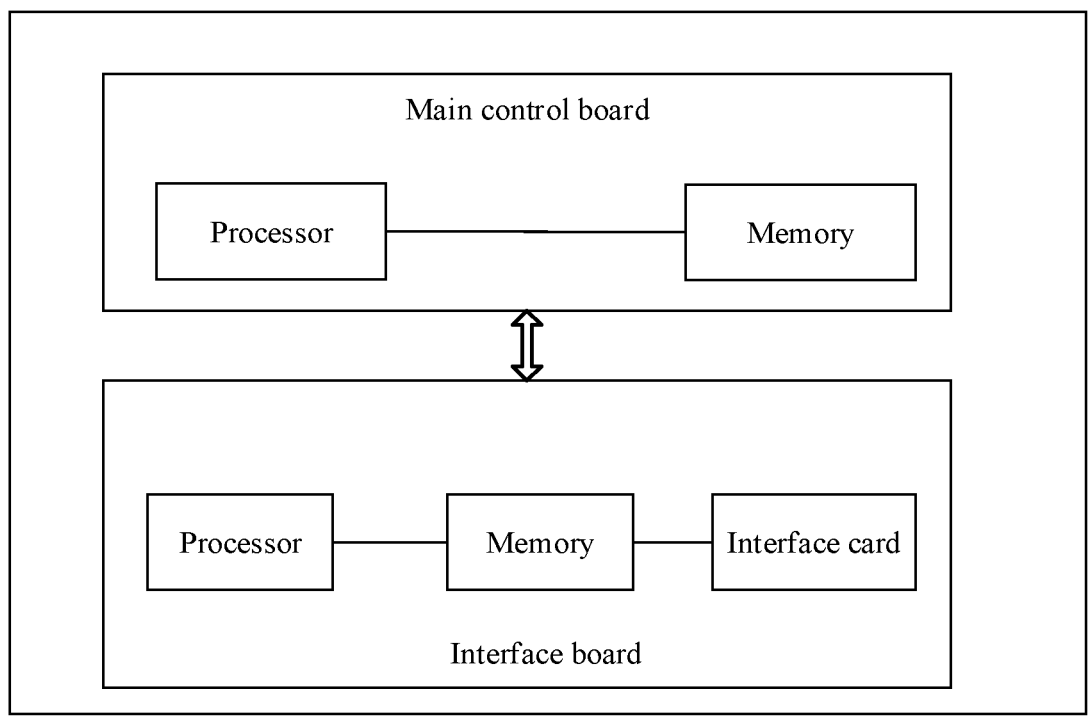
FIG. 10 is a schematic diagram of a structure of a network device according to an embodiment of this application.

2. As shown in FIG. 10, the control device or the network device includes a main control board and an interface board, the main control board includes a processor and a memory, and the interface board includes a processor, a memory, and an interface card. The processor of the interface board is configured to invoke program instructions in the memory of the interface board to receive and send a packet. The processor of the main control board is configured to invoke program instructions in the memory of the main control board to perform corresponding processing functions.

For example, for the network device, the interface card of the interface board of the network device is configured to receive a packet, data information, or the like. For example, as described in 4022B shown in FIG. 4, the interface card reports the exception information to the control device. Alternatively, the interface card is configured to perform step 606 shown in FIG. 6, to report the update information of the target service level to the controller. Alternatively, the interface card is configured to perform step 608 shown in FIG. 6, to report the exception information to the controller. The processor of the main control board is configured to perform processing-related steps of the first network device in the foregoing embodiment. For example, the processor performs processing steps 401 and 402 that are performed by the first network device shown in FIG. 4. For another example, the processor performs processing steps 601 to 605 and step 607 that are performed by the first network device shown in FIG. 6.

It should be noted that any apparatus embodiment described above is merely an example. The units described as separate parts may or may not be physically separate, and parts displayed as units may or may not be physical units, and may be located in one position, or may be distributed on a plurality of network units. Some or all the modules may be selected based on an actual requirement to achieve the objectives of the solutions of embodiments. In addition, in the embodiment accompanying drawings of the first network node or the controller provided in the present application, a connection relationship between modules indicates that there is a communication connection between the modules, and the communication connection may be implemented as one or more communications buses or signal cables. A person of ordinary skill in the art may understand and implement embodiments without creative efforts.

The methods or algorithm steps described with reference to the content disclosed in embodiments of the present application may be implemented by hardware, or may be implemented by a processor by executing software instructions. The software instructions may include corresponding software modules. The software module may be stored in a random-access memory (RAM), a flash memory, a ROM, an erasable programmable read-only memory (EPROM), an electrically erasable programmable read-only memory (EEPROM), a hard disk, a removable hard disk, a compact disc, or any other form of storage medium well-known in the art. For example, a storage medium is coupled to the processor, so that the processor can read information from the storage medium and can write information into the storage medium. Certainly, the storage medium may be a component of the processor. The processor and the storage medium may be located in an application-specific integrated circuit (ASIC). In addition, the ASIC may be located in a core network interface device. Certainly, the processor and the storage medium may exist in the core network interface device as discrete components.

A person skilled in the art should be aware that in the foregoing one or more examples, functions described in the embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium. The communication medium includes any medium that facilitates transmission of a computer program from one place to another. The storage medium may be any available medium accessible to a general-purpose or dedicated computer.

Figure 11:
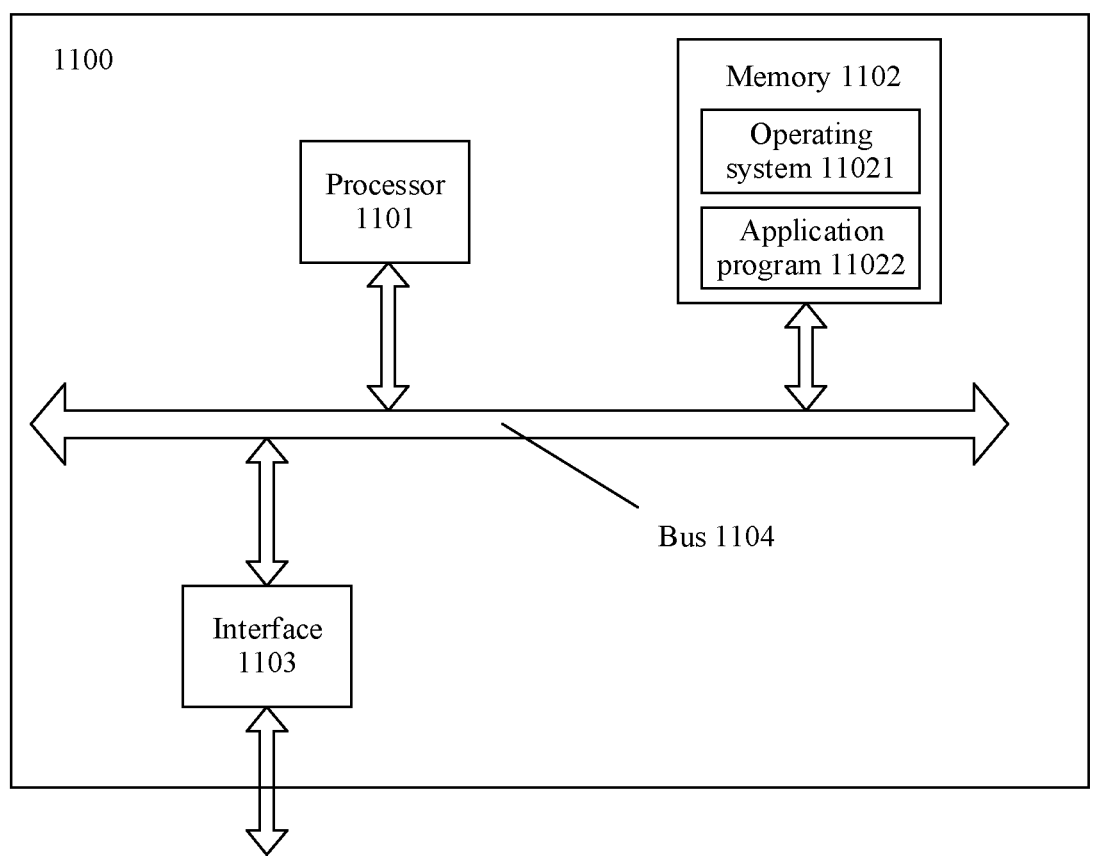
FIG. 11 is a schematic diagram of a structure of a device for dynamically adjusting a service level according to an embodiment of this application.

FIG. 11 is a schematic diagram of a hardware structure of a device 1100 for dynamically adjusting a service level according to an embodiment of this application. The device 1100 for dynamically adjusting a service level shown in FIG. 11 may perform corresponding steps in the method for dynamically adjusting a service level provided in the embodiment shown in FIG. 4 or FIG. 6.

As shown in FIG. 11, the device 1100 for dynamically adjusting a service level includes a processor 1101, a memory 1102, an interface 1103, and a bus 1104. The interface 1103 may be implemented in a wireless or wired manner. For example, the interface 1103 may be a network adapter. The processor 1101, the memory 1102, and the interface 1103 are connected through the bus 1104.

The interface 1103 may include a transmitter and a receiver, and is configured to communicate with another communications device. For example, as described in 4022B shown in FIG. 4, the interface 1103 reports the exception information to the control device. Alternatively, the interface 1103 is configured to perform step 606 shown in FIG. 6, to report the update information of the target service level to the controller. Alternatively, the interface 1103 is configured to perform step 608 shown in FIG. 6, to report the exception information to the controller.

The processor 1101 is configured to perform processing-related steps 401 and 402 in the embodiment shown in FIG. 4. For another example, the processor 1101 performs processing steps 601 to 605 and step 607 that are performed by the first network device shown in FIG. 6; and/or the processor 1101 is configured to perform another process of the technology described in this specification. The memory 1102 includes an operating system 11021 and an application program 11022, and is configured to store a program, code, or instructions. When executing the program, the code, or the instructions, the processor or a hardware device may complete the processing process of the device 1100 for dynamically adjusting a service level in the method embodiment. Optionally, the memory 1102 may include a ROM and a RAM. The ROM includes a basic input/output system (BIOS) or an embedded system. The RAM includes an application program and an operating system. When the device 1100 for dynamically adjusting a service level needs to run, the device 1100 for dynamically adjusting a service level is started by using the BIOS built into the ROM or a bootloader bootstrap system in the embedded system, to boot the device 1100 for dynamically adjusting a service level to enter a normal running state. After entering the normal running state, the device 1100 for dynamically adjusting a service level runs the application program and the operating system in the RAM, to complete the processing process of the device 1100 for dynamically adjusting a service level in the method embodiment.

In an example, FIG. 11 merely shows a simplified design of the device 1100 for dynamically adjusting a service level. In actual application, the device 1100 for dynamically adjusting a service level may include any quantity of interfaces, processors, or memories.

It should be understood that the processor may be a central processing unit (CPU), or may be another general-purpose processor, a digital signal processor (DSP), an ASIC, a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computer (RISC) machines (ARM) architecture.

Further, in an optional embodiment, the memory may include a read-only memory and a RAM, and provide instructions and data for the processor. The memory may further include a non-volatile RAM. For example, the memory may further store information about a device type.

The memory may be a volatile memory or a non-volatile memory, or may include both a volatile memory and a non-volatile memory. The non-volatile memory may be a ROM, a programmable read-only memory (PROM), an EPROM, an EEPROM, or a flash memory. The volatile memory may be the RAM, used as an external cache. By way of example but not limitation, many forms of RAMs may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a SynchLink dynamic random-access memory (SLDRAM), and a direct Rambus random-access memory (DR RAM).

A computer-readable storage medium is further provided. The storage medium stores at least one instruction, and the instruction is loaded and executed by a processor to implement any one of the foregoing methods for dynamically adjusting a service level.

This application provides a computer program. When the computer program is executed by a computer, a processor or the computer is enabled to perform corresponding steps and/or procedures in the foregoing method embodiments.

A chip is provided. The chip includes a processor, configured to invoke, from a memory, instructions stored in the memory and run the instructions, so that a communications device on which the chip is installed performs the methods in the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

All or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disk (DVD)), or a semiconductor medium (for example, a solid-state drive (SSD)).

The objectives, technical solutions, and beneficial effects of this application are further described in detail in the foregoing embodiments. It should be understood that the foregoing descriptions are merely embodiments of this application, but are not intended to limit the protection scope of this application. Any modification, equivalent replacement, or improvement made based on technical solutions of this application shall fall within the protection scope of this application.

What is claimed is:

1. A service level adjustment method implemented by a first network device, wherein the service level adjustment method comprises:
    obtaining at least one piece of queue status information of a queue bound to a target service level of the first network device;
    adjusting a parameter of the target service level based on a maximum delay associated with the target service level when any piece of queue status information of the at least one piece of queue status information exceeds a first threshold upper limit, wherein the parameter of the target service level comprises a queue resource parameter and a data flow constraint parameter, and wherein the data flow constraint parameter comprises a threshold of a burst amount of a data flow entering the queue and a threshold of an average rate of the data flow;

reporting exception information to a control device when an update value of the parameter does not meet a constraint condition of a local target resource and when the maximum delay remains unchanged, wherein the local target resource is a resource that is able to be preempted by the target service level;

receiving a first adjustment value that is of the parameter and that is received from the control device, wherein the first adjustment value is based on the exception information; and adjusting the parameter based on the first adjustment value of the parameter.

2. The service level adjustment method of claim 1, wherein adjusting the parameter of the target service level based on a maximum delay associated with the target service level comprises adjusting the parameter further based on the update value of the parameter when the update value meets the constraint condition of a local target resource and when the maximum delay remains unchanged, and wherein the local target resource is able to be preempted by the target service level.

3. The service level adjustment method of claim 2, wherein after adjusting the parameter of the target service level based on the update value of the parameter, the service level adjustment method further comprises adjusting the parameter from the update value back to a value existing before adjustment to the update value when the any piece of queue status information does not exceed a second threshold upper limit within a first time threshold.

4. The service level adjustment method of claim 2, wherein after adjusting the parameter based on the update value of the parameter, the service level adjustment method further comprises reporting update information of the target service level to a control device when the any piece of queue status information exceeds a third threshold upper limit within a first time threshold, and wherein the update information comprises the update value of the parameter of the target service level.

5. The service level adjustment method of claim 1, wherein an update value of the data flow constraint parameter is based on an actually arriving data flow, and wherein an update value of the queue resource parameter is based on the update value of the data flow constraint parameter when the maximum delay remains unchanged.

6. The service level adjustment method of claim 5, wherein the queue resource parameter comprises a queue bandwidth and a queue buffer, wherein the update value of the queue resource parameter comprises a bandwidth of a port corresponding to the target service level, a maximum amount of data that can be forwarded after the target service level is adjusted, a maximum amount of data that can be forwarded at each service level of a plurality of service levels of the first network device before the target service level is adjusted, and a maximum packet length of a queue corresponding to the each service level when the maximum delay remains unchanged, wherein the queue bandwidth is based on the bandwidth of the port corresponding to the target service level, the maximum amount of data that can be forwarded after the target service level is adjusted, and the maximum amount of data that can be forwarded at the each service level before the target service level is adjusted, and wherein the queue buffer is based on the maximum amount of data that can be forwarded at the each service level before the target service level is adjusted, the maximum packet length of the queue corresponding to each service level, an update value of a threshold of a burst amount of a data flow at the target service level, and an update value of a threshold of an average rate of the data flow.

7. The service level adjustment method of claim 6, wherein the queue bandwidth $C_i^2$ of the target service level is according to the following formula:

$$C_i^2 = C\frac{Q_i^2}{\sum_{1\leq j\leq n, j\neq i} Q_j + Q_i^1 + Q_{n+1}^1},$$

wherein C is the bandwidth of the port corresponding to the target service level, wherein $Q_i^2$ is the maximum amount of data that can be forwarded after the target service level is adjusted, wherein $Q_j$ is a maximum amount of data that can be forwarded at a $j^{th}$ service level, wherein $Q_i^1$ is a maximum amount of data that can be forwarded before the target service level is adjusted, wherein $Q_{n+1}^1$ is a maximum amount of data that can be forwarded in a non-delay-guarantee queue before the target service level is adjusted, and wherein n is a positive integer greater than 1.

8. The service level adjustment method of claim 6, wherein the queue buffer $BF_i^2$ of the target service level is according to the following formula:

$$BF_i^2 = \left(\frac{L_{max,L} + \sum_{1\leq j\leq n, j\neq i}(L_j + Q_j) + L_{n+1} + Q_{n+1}^2}{C} + \frac{L_i\left(\sum_{1\leq j\leq n, j\neq i}Q_j + Q_{n+1}^2\right)}{CQ_i^2}\right) * r_i^2 + b_i^2,$$

wherein C is the bandwidth of the port corresponding to the target service level, wherein $Q_i^2$ is the maximum amount of data that can be forwarded after the target service level is adjusted, wherein $Q_j$ is a maximum amount of data that can be forwarded at a $j^{th}$ service level, wherein $Q_i^1$ is a maximum amount of data that can be forwarded before the target service level is adjusted, wherein $Q_{n+1}^1$, is a maximum amount of data that can be forwarded in a non-delay-guarantee queue before the target service level is adjusted, wherein $L_{max,L}$ is a maximum packet length of a low-priority queue, wherein $L_{n+1}$ is a maximum packet length of the non-delay-guarantee queue, wherein $L_j$ is a maximum packet length of a queue at the $j^{th}$ service level, wherein $b_i^2$ is the update value of the threshold of the burst amount of the data flow, wherein $r_i^2$ is the update value of the threshold of the average rate of the data flow, wherein $L_i$ is a maximum packet length of a queue at the target service level, and wherein n is a positive integer greater than 1.

9. The service level adjustment method of claim 1, wherein the queue status information comprises at least one of queue buffer occupation, a packet queuing delay, or a queue packet count.

10. A service level adjustment apparatus, comprising:
a processor; and
a non-transitory memory configured to store instructions that, when executed by the processor, cause the service level adjustment apparatus to be configured to:
obtain at least one piece of queue status information of a queue bound to a target service level;
adjust a parameter of the target service level based on a maximum delay associated with the target service level when any piece of queue status information of the at least one piece of queue status information exceeds a first threshold upper limit, wherein the parameter of the target service level comprises a queue resource parameter and a data flow constraint parameter, and wherein the data flow constraint parameter comprises a threshold of a burst amount of a data flow entering the queue and a threshold of an average rate of the data flow;
report exception information to a control device when an update value of the parameter does not meet a constraint condition of a local target resource and when the maximum delay remains unchanged, wherein the local target resource is a resource that is able to be preempted by the target service level;
receive a first adjustment value that is of the parameter and that is received from the control device, wherein the first adjustment value is based on the exception information; and
adjust the parameter based on the first adjustment value of the parameter.

11. The service level adjustment apparatus of claim 10, wherein the instructions, when executed by the processor, further cause the service level adjustment apparatus to be configured to adjust the parameter based on the update value of the parameter when the update value meets the constraint condition of a local target resource and when the maximum delay remains unchanged, and wherein the local target resource is able to be preempted by the target service level.

12. The service level adjustment apparatus of claim 11, wherein the instructions, when executed by the processor, further cause the service level adjustment apparatus to be configured to adjust the parameter from the update value back to a value existing before adjustment to the update value when the any piece of queue status information does not exceed a second threshold upper limit within a first time threshold.

13. The service level adjustment apparatus of claim 11, wherein the instructions, when executed by the processor, further cause the service level adjustment apparatus to be configured to report update information of the target service level to a control device when the any piece of queue status information exceeds a third threshold upper limit within a first time threshold, wherein the update information comprises the update value of the parameter of the target service level.

14. The service level adjustment apparatus of claim 11, wherein an update value of the data flow constraint parameter is based on an actually arriving data flow, and wherein an update value of the queue resource parameter is based on the update value of the data flow constraint parameter when the maximum delay remains unchanged.

15. The service level adjustment apparatus of claim 14, wherein the queue resource parameter comprises a queue bandwidth and a queue buffer, wherein the data flow constraint parameter of the target service level comprises a threshold of a burst amount of a data flow and a threshold of an average rate of the data flow, wherein the update value of the queue resource parameter comprises a bandwidth of a port corresponding to the target service level, a maximum amount of data that can be forwarded at the target service level after the target service level is adjusted, a maximum amount of data that can be forwarded at each service level of a plurality of service levels of the apparatus before the target service level is adjusted, and a maximum packet length of a queue corresponding to the each service level when the maximum delay remains unchanged,
wherein the queue bandwidth is based on the bandwidth of the port corresponding to the target service level, the maximum amount of data that can be forwarded at the target service level after the target service level is adjusted, and the maximum amount of data that can be forwarded at the each service level before the target service level is adjusted, and
wherein the queue is buffer based on the maximum amount of data that can be forwarded at the each service level before the target service level is adjusted, the maximum packet length of the queue corresponding to the each service level, an update value of a threshold of a burst amount of a data flow at the target service level, and an update value of a threshold of an average rate of the data flow.

16. The service level adjustment apparatus of claim 15, wherein the queue bandwidth $C_i^2$ of the target service level is according to the following formula:

$$C_i^2 = C \frac{Q_i^2}{\sum_{1 \le j \le n, j \ne i} Q_j + \phi_i^1 + Q_{n+1}^1},$$

wherein C is the bandwidth of the port corresponding to the target service level, wherein $Q_i^2$ is the maximum amount of data that can be forwarded after the target service level is adjusted, wherein $Q_j$ is a maximum amount of data that can be forwarded at a $j^{th}$ service level, wherein $Q_i^1$ is a maximum amount of data that can be forwarded before the target service level is adjusted, wherein $Q_{n+1}^1$ is a maximum amount of data that can be forwarded in a non-delay-guarantee queue before the target service level is adjusted, and wherein n is a positive integer greater than 1.

17. The service level adjustment apparatus of claim 15, wherein the queue buffer $BF_i^2$ of the target service level is according to the following formula:

$$BF_i^2 = \left( \frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_i^2} \right) * r_i^2 + b_i^2,$$

wherein C is the bandwidth of the port corresponding to the target service level, wherein $Q_i^2$ is the maximum amount of data that can be forwarded after the target service level is adjusted, wherein $Q_j$ is a maximum amount of data that can be forwarded at a $j^{th}$ service level, wherein $Q_i^1$ is a maximum amount of data that can be forwarded before the target service level is adjusted, wherein $Q_{n+1}^1$ is a maximum amount of data that can be forwarded in a non-delay-guarantee queue before the target service level is adjusted, wherein $L_{max,L}$ is a maximum packet length of a low-priority queue, wherein $L_{n+}1$ is a maximum packet length of the non-delay-guarantee queue, wherein $L_j$ is a maximum packet length of a queue at the $j^{th}$ service level, wherein $b_i^2$ is the update value of the threshold of the burst amount of the data flow, wherein $r_i^2$ is the update value of the threshold of the average rate of the data flow, wherein $L_i$ is a maximum packet length of a queue at the target service level, and n is a positive integer greater than 1.

18. The service level adjustment apparatus of claim 10, wherein the queue status information comprises at least one of a queue buffer occupation, a packet queuing delay, or a queue packet count.

19. A computer program product comprising computer-executable instructions that are stored on a non-transitory computer-readable storage medium and that, when executed by a processor, cause a service level adjustment apparatus to:
obtain at least one piece of queue status information of a queue bound to a target service level of a first network device;
adjust a parameter of the target service level based on a maximum delay associated with the target service level when any piece of queue status information of the at least one piece of queue status information exceeds a first threshold upper limit, wherein the parameter of the target service level comprises a queue resource parameter and a data flow constraint parameter, and wherein the data flow constraint parameter comprises a threshold of a burst amount of a data flow entering the queue and a threshold of an average rate of the data flow,
wherein an update value of the data flow constraint parameter is based on an actually arriving data flow, and wherein an update value of the queue resource parameter is based on the update value of the data flow constraint parameter when the maximum delay remains unchanged,
wherein the queue resource parameter comprises a queue bandwidth and a queue buffer, wherein the update value of the queue resource parameter comprises a bandwidth of a port corresponding to the target service level, a maximum amount of data that can be forwarded after the target service level is adjusted, a maximum amount of data that can be forwarded at each service level of a plurality of service levels of the first network device before the target service level is adjusted, and a maximum packet length of a queue corresponding to the each service level when the maximum delay remains unchanged, wherein the queue bandwidth is based on the bandwidth of the port corresponding to the target service level, the maximum amount of data that can be forwarded after the target service level is adjusted, and the maximum amount of data that can be forwarded at the each service level before the target service level is adjusted, and wherein the queue buffer is based on the maximum amount of data that can be forwarded at the each service level before the target service level is adjusted, the maximum packet length of the queue corresponding to each service level, an update value of a threshold of a burst amount of a data flow at the target service level, and an update value of a threshold of an average rate of the data flow.

20. The computer program product of claim 19, wherein the queue status information comprises at least one of queue buffer occupation, a packet queuing delay, or a queue packet count.

* * * * *

UNITED STATES PATENT AND TRADEMARK OFFICE
CERTIFICATE OF CORRECTION

PATENT NO. : 12,335,113 B2
APPLICATION NO. : 17/870435
DATED : June 17, 2025
INVENTOR(S) : Shuang Chen et al.

Page 1 of 1

It is certified that error appears in the above-identified patent and that said Letters Patent is hereby corrected as shown below:

On the Title Page

Page 3, (56) References Cited, Foreign Patent Documents: "IN 102739507 A 10/2012" should read "CN 102739507 A 10/2012"

In the Claims

Claim 16, Column 36, Line 30: "$Q_j+\phi^1_i+Q^1_{n+1}$" should read ""$Q_j+Q^1_i+Q^1_{n+1}$"

Signed and Sealed this
Twenty-ninth Day of July, 2025

Coke Morgan Stewart
*Acting Director of the United States Patent and Trademark Office*